United States Patent
Rowe et al.

(10) Patent No.: US 9,749,823 B2
(45) Date of Patent: Aug. 29, 2017

(54) PROVIDING CITY SERVICES USING MOBILE DEVICES AND A SENSOR NETWORK

(75) Inventors: Richard E. Rowe, Las Vegas, NV (US); Jean-Louis Fiorucci, Nice (FR)

(73) Assignee: Mentis Services France, Nice (FR)

( * ) Notice: Subject to any disclaimer, the term of this patent is extended or adjusted under 35 U.S.C. 154(b) by 0 days.

(21) Appl. No.: 12/763,077

(22) Filed: Apr. 19, 2010

(65) Prior Publication Data
US 2011/0143779 A1    Jun. 16, 2011

Related U.S. Application Data

(63) Continuation-in-part of application No. PCT/US2010/020799, filed on Jan. 12, 2010.
(Continued)

(51) Int. Cl.
*G06Q 10/08* (2012.01)
*G06Q 30/02* (2012.01)
(Continued)

(52) U.S. Cl.
CPC .............. *H04W 4/18* (2013.01); *G06Q 30/02* (2013.01); *G08G 1/14* (2013.01); *G08G 1/147* (2013.01);
(Continued)

(58) Field of Classification Search
CPC ......... G06Q 10/08; G06Q 30/02; G01C 21/20
(Continued)

(56) References Cited

U.S. PATENT DOCUMENTS

| 5,710,743 A | 1/1998 | Dee et al. |
| 6,266,609 B1 | 7/2001 | Fastenrath |

(Continued)

FOREIGN PATENT DOCUMENTS

| EP | 0965962 B1 | 10/2009 |
| JP | 066243396 A | 9/1994 |

(Continued)

OTHER PUBLICATIONS

Wang et al., "Location Based Services for Mobiles: Technologies and Standards," presented at IEEE International Conference on Communications, May 19-23, 2008, Beijing, China.
(Continued)

*Primary Examiner* — Talia Crawley
(74) *Attorney, Agent, or Firm* — Kwan & Olynick LLP

(57) ABSTRACT

Apparatus and methods related providing city services, such as parking, are described. A mobile device can be configured to receive information from local sensor nodes, such as parking sensor nodes, in the vicinity of the mobile device. In a parking application, the mobile device located in a moving vehicle can be configured to locate available parking based upon the information received from the parking sensor nodes. In other embodiments, the mobile device can be utilized in a retail establishment in conjunction with a remote server to display eye-level image data taken at various locations throughout the retail establishment. The eye-level image data can include products displayed throughout the retail establishment and can be augmented with one or more indicators that indicate product placement locations associated with the products.

18 Claims, 11 Drawing Sheets

Related U.S. Application Data

(60) Provisional application No. 61/285,860, filed on Dec. 11, 2009, provisional application No. 61/320,237, filed on Apr. 1, 2010.

(51) Int. Cl.

| | |
|---|---|
| *G01C 21/20* | (2006.01) |
| *H04W 4/18* | (2009.01) |
| *G08G 1/14* | (2006.01) |
| *H04M 3/42* | (2006.01) |
| *H04W 4/02* | (2009.01) |

(52) U.S. Cl.
CPC ......... *H04M 3/42348* (2013.01); *H04W 4/02* (2013.01); *H04M 2203/359* (2013.01); *H04M 2207/18* (2013.01); *H04M 2242/15* (2013.01); *H04W 4/026* (2013.01)

(58) Field of Classification Search
USPC .......................................... 705/28, 26, 14.64
See application file for complete search history.

(56) References Cited

U.S. PATENT DOCUMENTS

| | | | |
|---|---|---|---|
| 6,285,297 B1 | 9/2001 | Ball | |
| 6,334,090 B1 | 12/2001 | Fujii | |
| 6,386,450 B1* | 5/2002 | Ogasawara | G06K 17/0022 235/380 |
| 6,411,937 B1 | 6/2002 | Brusseaux | |
| 6,587,835 B1* | 7/2003 | Treyz | G06Q 20/12 705/14.64 |
| 6,647,269 B2 | 11/2003 | Hendrey et al. | |
| 6,885,311 B2 | 4/2005 | Howard et al. | |
| 6,912,507 B1 | 6/2005 | Phillips et al. | |
| 7,014,355 B2 | 3/2006 | Potter, Sr. | |
| 7,147,154 B2 | 12/2006 | Myers et al. | |
| 7,188,154 B2 | 3/2007 | Minowa | |
| 7,224,274 B2 | 5/2007 | Silverbrook | |
| 7,309,009 B2* | 12/2007 | Singer-Harter | G06Q 30/02 235/375 |
| 7,342,510 B2 | 3/2008 | Pate | |
| 8,330,624 B2 | 12/2012 | Groft et al. | |
| 8,423,431 B1* | 4/2013 | Rouaix | B65G 1/1373 705/28 |
| 8,489,112 B2 | 7/2013 | Roeding et al. | |
| 8,600,800 B2 | 12/2013 | Rowe et al. | |
| 9,159,080 B2 | 10/2015 | Fiorucci et al. | |
| 2002/0007306 A1 | 1/2002 | Granger et al. | |
| 2002/0008639 A1 | 1/2002 | Dee | |
| 2002/0084917 A1 | 7/2002 | Hauptman et al. | |
| 2002/0087401 A1 | 7/2002 | Leapman et al. | |
| 2002/0099574 A1 | 7/2002 | Cahill et al. | |
| 2002/0109610 A1 | 8/2002 | Katz | |
| 2003/0014315 A1 | 1/2003 | Jaalinoja et al. | |
| 2004/0181496 A1 | 9/2004 | Odinotski et al. | |
| 2004/0226993 A1 | 11/2004 | Fulcher et al. | |
| 2004/0252034 A1 | 12/2004 | Slemmer et al. | |
| 2004/0260605 A1 | 12/2004 | McIntyre et al. | |
| 2005/0168352 A1 | 8/2005 | Tomer | |
| 2005/0228583 A1 | 10/2005 | Capuano | |
| 2005/0229451 A1 | 10/2005 | Mullens et al. | |
| 2005/0258632 A1 | 11/2005 | Currier | |
| 2005/0280555 A1 | 12/2005 | Warner | |
| 2006/0010046 A1* | 1/2006 | Van Zandt | G06Q 10/08 705/26.9 |
| 2006/0072010 A1* | 4/2006 | Haering | G06T 7/246 348/143 |
| 2006/0095344 A1 | 5/2006 | Nakfoor | |
| 2006/0116972 A1 | 6/2006 | Wong | |
| 2006/0143080 A1 | 6/2006 | Garg et al. | |
| 2006/0170566 A1 | 8/2006 | Slemmer et al. | |
| 2006/0212344 A1 | 9/2006 | Marcus et al. | |
| 2006/0250278 A1 | 11/2006 | Tillotson et al. | |
| 2006/0260166 A1 | 11/2006 | Pate | |
| 2006/0267799 A1 | 11/2006 | Mendelson | |
| 2006/0283941 A1* | 12/2006 | Singer-Harter | G06Q 30/02 235/383 |
| 2007/0050248 A1 | 3/2007 | Huang et al. | |
| 2007/0129974 A1 | 6/2007 | Chen et al. | |
| 2007/0191026 A1 | 8/2007 | Teplitsky | |
| 2007/0257818 A1 | 11/2007 | Aubrey et al. | |
| 2007/0290888 A1 | 12/2007 | Reif et al. | |
| 2008/0030373 A1 | 2/2008 | Montgomery | |
| 2008/0033824 A1 | 2/2008 | Packes, Jr. et al. | |
| 2008/0136674 A1 | 6/2008 | Jang et al. | |
| 2008/0291054 A1 | 11/2008 | Groft | |
| 2008/0308628 A1 | 12/2008 | Payne et al. | |
| 2009/0067846 A1 | 3/2009 | Yu et al. | |
| 2009/0077100 A1 | 3/2009 | Hancock et al. | |
| 2009/0204319 A1 | 8/2009 | Shanbhag et al. | |
| 2009/0313104 A1 | 12/2009 | Hafner et al. | |
| 2010/0029268 A1 | 2/2010 | Myer et al. | |
| 2010/0064025 A1 | 3/2010 | Nelimarkka et al. | |
| 2010/0070365 A1* | 3/2010 | Siotia | G01C 21/20 705/14.49 |
| 2010/0191584 A1 | 7/2010 | Fraser et al. | |
| 2010/0282836 A1* | 11/2010 | Kempf | G06Q 30/02 235/375 |
| 2011/0004507 A1 | 1/2011 | Potkonjak | |
| 2011/0060653 A1 | 3/2011 | King et al. | |
| 2011/0082746 A1 | 4/2011 | Rice et al. | |
| 2011/0320259 A1 | 12/2011 | Roumeliotis et al. | |
| 2012/0092190 A1 | 4/2012 | Stefik et al. | |
| 2012/0095791 A1 | 4/2012 | Stefik et al. | |
| 2013/0103460 A1 | 4/2013 | Groft et al. | |
| 2015/0066607 A1 | 3/2015 | Fiorucci et al. | |

FOREIGN PATENT DOCUMENTS

| | | |
|---|---|---|
| KR | 1020040082218 | 4/2006 |
| KR | 1020060021145 | 9/2007 |
| KR | 1020060022843 | 9/2007 |
| KR | 1020070091704 | 9/2007 |
| KR | 1020070092548 | 9/2007 |
| KR | 1020060111611 | 11/2007 |
| KR | 1020070778618 | 11/2007 |
| KR | 1020080041730 | 11/2008 |
| KR | 1020080100128 | 11/2008 |
| WO | WO 00/75876 | 12/2000 |
| WO | WO 02/09050 | 1/2002 |
| WO | WO 2008/060016 | 5/2008 |
| WO | 2009154787 A2 | 12/2009 |
| WO | WO 2009/154787 | 12/2009 |

OTHER PUBLICATIONS

International Search Report dated Dec. 1, 2010 from International Application No. PCT/US2010/020799.
Written Opinion dated Dec. 1, 2010 from International Application No. PCT/US2010/020799.
Extended European Search Report dated Sep. 13, 2011 from European Application No. 11160747.9.
U.S. Final Office Action dated Jan. 24, 2013 from U.S. Appl. No. 13/183,242.
U.S. Office Action dated Feb. 9, 2012 in U.S. Appl. No. 12/763,077.
U.S. Office Action dated Mar. 28, 2012 in U.S. Appl. No. 13/183,242.
U.S. Final Office Action dated Nov. 8, 2012 in U.S. Appl. No. 12/763,077.
U.S. Office Action dated Dec. 28, 2012 in U.S. Appl. No. 12/876,382.
U.S. Office Action dated Jan. 24, 2013 from U.S. Appl. No. 13/183,242.
Extended Search Report dated Jan. 7, 2013 from European Application No. 12175949.2.
Notice From the European Patent Office dated Oct. 1, 2007 Concerning Business Methods, Official Journal of the European Patent Office, vol. 30, No. 11, pp. 592-593, XP007905525.

(56) References Cited

OTHER PUBLICATIONS

"U.S. Appl. No. 12/876,382, Notice of Allowance mailed Sep. 11, 2013".
"U.S. Appl. No. 13/180,288, Examiner Interview Summary mailed Nov. 27, 2013".
"U.S. Appl. No. 13/180,288, Final Office Action mailed Mar. 20, 2014".
"U.S. Appl. No. 13/180,288, Non Final Office Action mailed Jul. 30, 2013".
"U.S. Appl. No. 13/370,169, Examiner Interview Summary mailed Mar. 13, 2014".
"U.S. Appl. No. 13/370,169, Examiner Interview Summary mailed Jul. 2, 2013".
"U.S. Appl. No. 13/370,169, Final Office Action mailed Nov. 7, 2013".
"U.S. Appl. No. 13/370,169, Non Final Office Action mailed Apr. 17, 2013".
"U.S. Appl. No. 13/370,169, Non Final Office Action mailed Sep. 24, 2014".
"Thanks Again Launches Customer Loyalty Program for Tulsa International Airport", PR Web; Retrieved from Internet <thanksagain.com/thanks-again-launches-customer-loyalty-program-for-tulsa-international-airport/>, Mar. 3, 2011, pp. 1-2.
"U.S. Appl. No. 13/370,169, Final Office Action mailed Mar. 27, 2015", 6 pgs.
"U.S. Appl. No. 13/370,169, Notice of Allowance mailed Jun. 5, 2015", 16 pgs.
"U.S. Appl. No. 14/534,976, Non Final Office Action mailed Sep. 29, 2016", 24 pgs.
"European Application Serial No. 12175949.2, Office Action mailed Jan. 7, 2015", 5 pgs.
Whitworth, Damian , "Park Life", The Times, London, United Kingdom, Apr. 20, 2007.

* cited by examiner

PROVIDING CITY SERVICES USING MOBILE DEVICES AND A SENSOR NETWORK

CROSS REFERENCE TO RELATED APPLICATIONS

This application claims priority under 35 U.S.C. §120 and is continuation-in-part of PCT/US2010/020799, titled "Providing City Services Using Mobile Devices And A Sensor Network," filed Jan. 12, 2010 by Fiorucci et al., which claimed priority under 35 U.S.C. §119(e) from co-pending U.S. Provisional Patent Application No. 61/285,860, filed Dec. 11, 2009, titled "Providing City Services Using Mobile Devices And A Sensor Network" and this application further claims priority under 35 U.S.C. §119(e) from co-pending U.S. Provisional Patent Application No. 61/320,237, filed Apr. 1, 2010, titled "Providing City Services Using Mobile Devices And A Sensor Network," each of which is incorporated by reference and for all purpose.

FIELD OF THE INVENTION

The described embodiments relate generally to systems for providing services in a city environment. More particularly, the present embodiments relate to methods and apparatus for providing services in a city environment using retail sensor nets.

DESCRIPTION OF THE RELATED ART

A large variety of services are provided in cities. These services can be provided by public entities, such as local and national government agencies, as well as private entities, such as local merchants. Examples of public services include transportation and health related services. Examples of private services include providing items, such as food, clothing, fuel and entertainment.

Utilization of city services, both private and public, depends upon some type of transportation solution. The transportation solution can involve multiple modes of travel, such as driving and parking a personal car, taking a bus, taking a train, taking a ferry, riding a bike and walking. To utilize a particular service, a user must first be able to the reach the location where the service is provided and then often transport goods from one location to another location. In a city environment, because of traffic and congestion, transportation solutions for obtaining various services can often be both difficult and stressful. The stress and difficulties associated with obtaining city services lowers the quality of life among city residents and can lead to health problems.

A source of the difficulties with obtaining city services is that there is little real-time information that allows a user to make intelligent decisions in regards to formulating a transportation solution. For instance, real-time information that allows a user to locate a parking space near a desired service is not available in cities all around the world. In addition, the parking information is not integrated with real-time information associated other modes of transportation, such as riding a bike or taking a bus, that may be available to provide the basis of a transportation solution.

Further, transportation information is not coordinated with pertinent service related information, such as service availability, that can affect decisions regarding a transportation solution. For instance, a user can decide to drive to a location and seek parking. After a lengthy parking search, the user may leave their car only to find out the service is unavailable or only available after some lengthy time period at which point the user may abandon their quest for the service. If the user had real-time information about the service availability, the user could have decided to seek services at another location and avoid wasting their time and generating unnecessary pollution and congestion while searching for a parking space. Thus, what is desired and disclosed herein is an apparatus, system and method that help users formulate better transportation decisions in a city environment.

SUMMARY OF THE DESCRIBED EMBODIMENTS

This paper describes various embodiments that relate to systems, methods, and apparatus for providing city services, such as parking and transportation services. A mobile device can be configured to receive information from sensor nodes, such as parking sensor nodes, in the vicinity of the mobile device. In a parking application, the mobile device located in a moving vehicle can be configured to locate available parking based upon the information received from the parking sensor nodes. After an available parking space is obtained, the mobile device can be configured to initiate a purchase of parking and receive information related to parking enforcement from a remote server.

In one embodiment, a mobile device can be generally characterized as comprising, a processor, a memory coupled to the processor, a display, an input mechanism, a first communication interface configured for communication with a cellular network or a wireless data network, a second communication interface configured to receive information related to available parking broadcast from one or more local sensor nodes in communication range of the mobile device, the information including a location of the available parking. The processor can be configured to 1) determine a current location of the mobile device; 2) output a map to the display, said map including streets, the location of the mobile device and the location of the available parking; 3) receive a request to initiate a transaction to purchase parking via the input mechanism, 4) generate the transaction to purchase the parking via one or more communications with a remote device; and 5) receive an electronic receipt from the remote device indicating the parking is purchased.

In another embodiment, a sensor node can be generally characterized as comprising a processor, a memory coupled to the processor, a communication interface, and one or more sensors for detecting objects in an area where vehicles are parked. The processor can be configured to 1) receive data from the one or more sensors, 2) to determine, based upon the data, whether there is an unoccupied space in the area that can be utilized for parking of a vehicle; 3) to broadcast information relating to the unoccupied space including location information associated with the unoccupied space, 4) control a first time interval associated with how often the determination of whether there is the unoccupied space is made; and 5) control a second time interval associated with how often the information relating to the unoccupied space is broadcast.

In further embodiments, a server can be generally characterized as comprising: a processor, a memory coupled to the processor and a communication interface for communicating with a plurality of mobile devices; where the processor can be configured to receive a request for a parking purchase from a first mobile device, said request including information including location information gathered by the first mobile device from one or more local sensor nodes in communication range of the first mobile device. The processor can be configured to 1) verify the location of the first mobile device based upon at least the location information gathered by the first mobile device, 2) verify financial information used to purchase the parking, 3) generate an electronic receipt including an electronic token used to enforce the parking purchase; 4) determine whether any promotions are available within an area that is proximate to the location of the first mobile device; 5) send to the first mobile device the electronic receipt including the electronic token and information regarding a first promotion that is available within the area proximate to the location of the first mobile device; and 6) verified a validity of a previously generated electronic token.

Another aspect can be generally characterized as a server comprising a processor and a memory and at least one communication interface. The processor can be designed or configured 1) to receive first image data of an interior of a retail establishment wherein the image data is taken from an eye-level perspective and includes one or more products displayed in the retail establishment; 2) store the first image data to the memory; 3) locate in the first image data at least one object; 4) determine a location in the first image data to render an indicator wherein the indicator is rendered over the first image data and wherein the determined location of the indicator is proximate to at least one product placement location that appears in the first image data; 5) generate second image data including a portion of the first image data and the indicator rendered at the determined location in the first image data and 6) send the second image data to a mobile device in communication with the server via the communication interface.

Another aspect can be generally characterized as a method in a server. The method can include: 1) receiving, via a communication interface coupled to the server, first image data of an interior of the retail establishment wherein the image data is taken from an eye-level perspective and includes one or more products displayed in the retail establishment; 2) storing, under control of a processor, coupled to the server, the first image data to a memory coupled to the server; 3) executing, under control of the processor, object recognition software wherein at least one object is recognized in the first image data via the object recognition software; 4) determining, under control of the processor, a location in the first image data to render an indicator wherein the indicator is rendered over the first image data and wherein the determined location of the indicator is proximate to at least one product placement location that appears in the first image data; 5) generating, under control of the processor, second image data including a portion of the first image data and the indicator rendered at the determined location; and 6) sending, under control of the processor, the second image data to a mobile device in communication with the server via the communication interface. The first image data can be received from the mobile device. Further, the method can further include i) receiving from the mobile device information identifying a product and in response locate eye-level image data stored in the image database including a product placement location for the product; and ii) sending the eye-level image data including the product placement location for the product to the mobile device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

Methods and apparatus are described that involve providing city services such as parking services using mobile devices.

Figure 1:
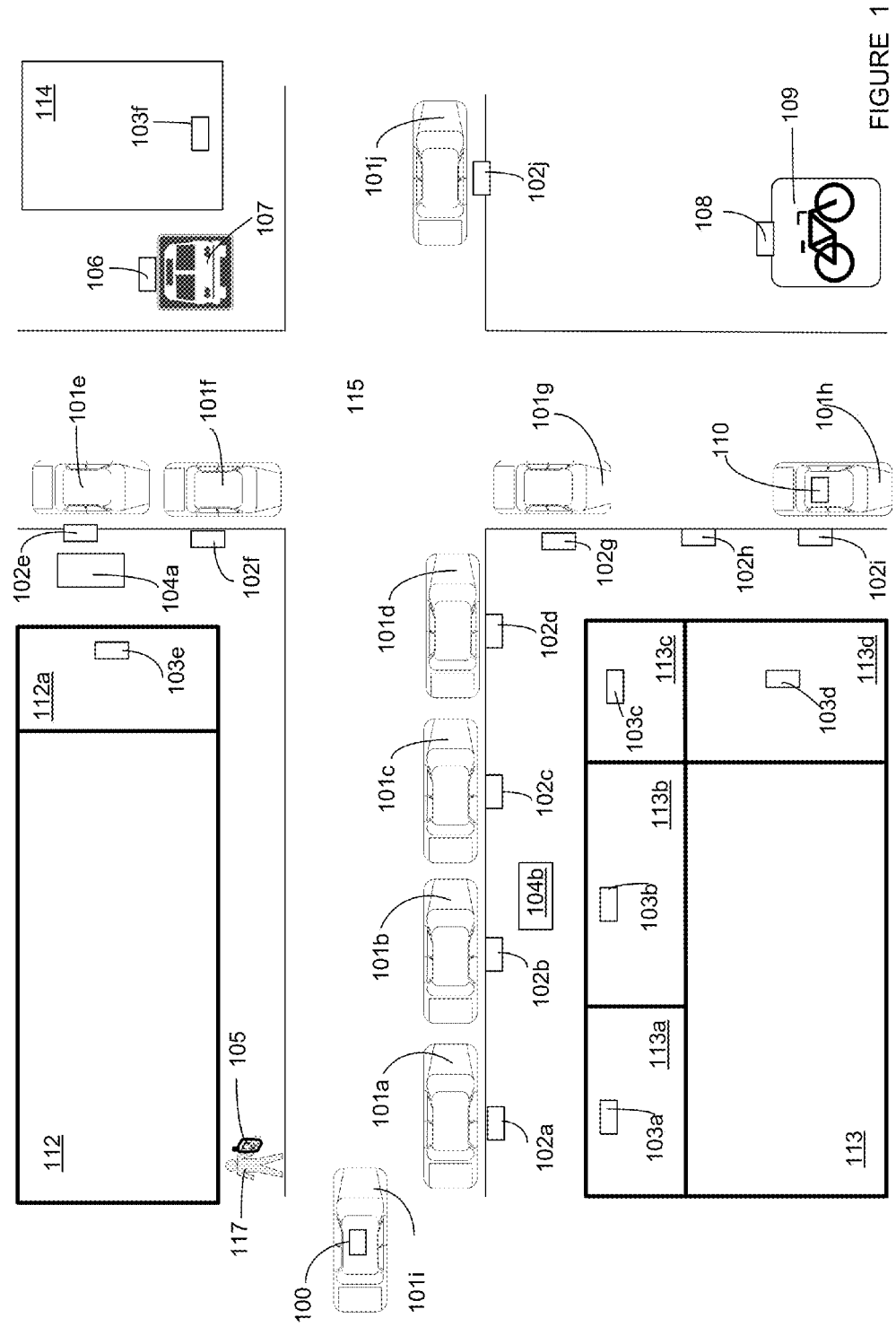
FIG. 1 is an illustration of mobile devices utilized in a city environment including sensor nets for one embodiment of the present invention.

FIG. 1 is an illustration of mobile devices utilized in a city environment including sensor nets for one embodiment of the present invention. The city environment includes roads 115, buildings 112, 113 and 114, parked automobiles 101a-101j, a mobile automobile 101j, a pedestrian 117 on a sidewalk 116, a bus stop 107, a bicycle station 109 and sensors, such as 102a-j, 103a-f, 106 and 108. The pedestrian 117 and the mobile automobile 101i are equipped with mobile devices, 105 and 100, respectively. As will be described in more detail below, real-time information about the public and/or private services can be generated by one or more local sensors and transmitted directly to one of the mobile devices, other sensors and one or more remote devices.

The building 112, 113 and 114 can be divided into one or more units, such as 112a and 113a-113d. Within each unit, a private or public entity can provide a service. For example, private services can include but are not limited to food, merchandise and entertainment services. Public services can include but are not limited to city government provided services, state government provided services and national government provided services, such as transportation services, postal services and health services. The sensors, 103a-103f, are located in units 112a and 113a-113d. These sensors can be configured to detect and transmit real-time information to a mobile device that is related to the services provided within the units. The real-time information can allow a user to make decisions in regards to the utilization of the services provided within the units.

Sensors can also be located near and associated with one or more transportation modes. These sensors can be used to broadcast real-time information that allows a user of the mobile device to make decisions in regards to formulating a transportation solution. For instance, sensors 102a-102j, are located proximate to the road 115 and can be configured to provide parking related information. Sensor 106 is located proximate to bus stop 107 and can be configured to provide bus related information. Sensor 108 is located proximate to bicycle station 109 and can be configured to provide bicycle sharing information. Sensor 110 is located in automobile 101h, which is configured for car sharing, and can be configured to provide car-sharing related information. Next, examples of real-time information that can be provided from the sensors, interactions between the sensors and a mobile device and interactions between the sensors are described.

Sensor Based Parking Services: Parking Detection and Location

In a first example, one or more sensors can detect and process information in regards to an availability of parking and broadcast this information in a manner that allows it to be directly detected by a mobile device. The sensors 102a-102i can include one or more detectors that can be configured to detect a presence of a vehicle, such as an automobile or a motor bike. After processing information gathered from the detector, each sensor can be configured to broadcast information that indicates real-time status information associated with the sensor.

For instance, a sensor can be configured to detect the presence of a vehicle. The vehicle detection can be performed at some detection interval. When a space is available, i.e., a vehicle is not present, the sensor can be configured to broadcast a message at some message interval, such as every fraction of second, every second or every few seconds. When a space is occupied, the sensor can be configured to not even broadcast a status message but may still be configured to check at some detection interval whether the space is still occupied, i.e., a status change has occurred.

The message interval and the detection interval can be based upon such considerations, as power consumption (broadcasting messages uses some amount power, thus, increasing the message interval can be used to conserve power), an expected traffic speed, a range of the sensor, how long spaces are typically occupied, a time of day and combinations thereof. For example, at night or after some time, such as midnight, the sensor can be configured to shut down or broadcast less frequently to conserve power. Further, the sensor can be configured to check less frequently whether it is occupied or not to conserve power depending on the time or other local conditions.

The message interval and detection interval do not have to be the same. Thus, a status message can be broadcast at one rate while a detection interval can be implemented at another rate. For instance, a status message can be broadcast once a second while the detection of whether a vehicle is present is performed every 30 seconds. In general, a sensor can include one or more detection devices and one or more communication interfaces where each of the one or more detection devices or communication interfaces is activated at different time intervals.

It is desirable for a mobile device located in a vehicle to receive information about a parking space in time for the driver to utilize the information. If the time interval is too long and/or the range of the sensor is too small, then a vehicle can pass the location of an available space during a time interval where a message is not being broadcast. Thus, power considerations may have to be balanced against the information being received in time to be useful.

In one embodiment, one or more of the parking sensors, such as 102a-102i, can include a sensor for detecting traffic speed and frequency. As part of a power management strategy, the sensors can be configured to determine measure how fast objects, such as vehicles, are passing the sensor and/or how frequently the objects, such as vehicles are passing the sensor. When vehicles are determined to be passing the sensor at a high rate, the sensor can be configured to increase either a frequency at which it broadcasts its status and/or increase the power used to broadcast its status and increase its message range so that it is received in a timely manner by a mobile device in an approaching vehicle. If the traffic speed is very slow, then the sensor can be configured to increase the time interval between messages and/or its rate at which it detects whether it is occupied or not to conserve power. When traffic is slow, a vehicle can be approaching an available parking space for a long time. Thus, longer detection and/or broadcast intervals can be utilized to conserve power without affecting the relevancy of the provided information.

In particular embodiments, one or more sensors, such as but not limited to the parking sensors, can be connected to a local power source, such as a solar collector. The solar collector can be coupled to a battery or a capacitor to provide back-up power, such as for night-time operations. The battery or capacitor can be chargeable, such as from the solar collector, or non-chargeable. In one embodiment, the power management can be configured to adjust operational parameters, such as a detection interval and a message interval depending on the available power. For instance, when power is plentiful and the battery is fully charged, one set of parameters for the detection interval, message interval and broadcast range of the sensor, such as a more frequent detection and message intervals and a maximum range can be used. When power is not plentiful, such as at night with a sensor that utilizes a solar collector, a different set of parameters for the detection interval, message interval and broadcast range can be used.

The one or more parking sensors can be configured detect the presence of a vehicle using a variety of apparatus in methods. For example, the one or more parking sensors can emit and detect reflected radio, infrared or sound waves to detect the presence of an object proximate to the sensor, such as a vehicle. In another embodiment, a metal detector can be used to detect the presence of a large source of metal, such as a car. In yet other embodiments, vehicle can include radio emitter, such as RFID tags that can be detected by the sensor. Also, a combination of detection methods can be employed. Further, details of detection devices that can be utilized in the embodiments described herein are described in PCT Application No. PCT/US08/07727, filed Jun. 19, 2008, by Fiorucci and Rowe, entitled Parking Locator and (ii) PCT application No. PCT/US2009/003682, filed Jun. 19, 2009, by Fiorucci and Rowe, entitled "Parking Locator and System and Including Vehicle User Identifiers," each of which is incorporated by reference and for all purposes.

In an urban parking environment, parking spaces can be delineated. For example, marking can be placed on a street surface, such as pavement to delineate parking spaces. In traditional parking implementations, a parking meter can be associated with each space. In one embodiment, one or more parking sensors can be associated with each delineated space where the one or more parking sensors can be configured to determine whether the delineated parking space is occupied. For instance, parking sensors 102a-102i could each be associated with a delineated parking space.

In alternate embodiments, the parking spaces may not be delineated. For undelineated parking, the parking sensors can be configured to determine available space over some detection range associated with the sensor. For instance, over some operating the range, such as 3-5 meters, a parking sensor can be configured to detect the presence of one or more objects and available space between the objects. The one or more parking sensors can be configured to broadcast an available space size, such as truck, large car, medium car, compact car and motorcycle or scooter or an actual distance between two objects, such as space between two adjacent vehicles.

A mobile device can be figured to filter size information received from the parking sensors so that only information about spaces of an applicable size is output. A parking application executed on the mobile device can be configured to allow a user to specify a car type where the application can communicate with a database containing car dimensions that allow the mobile device to determine the car dimensions such as a car length and then only provide information regarding parking spaces that are appropriate for the dimensions of the car. In another embodiment, a parking application can be configured to allow a user to enter a vehicle dimension, such as a car length or a scooter width and length. The parking application can be configured to add a margin to the entered vehicle dimension to determine a minimum parking space size. In operation, a mobile device executing the parking application could search for only parking spaces of an acceptable size for a particular vehicle.

In a particular embodiment, charges can be based upon how much space a vehicle occupies. For instance, smaller automobiles can be charged at a different rate than larger automobiles, such as a lower rate, and motor bikes can be charged at a different rate than automobiles. The rate can depend also depend on how an automobile uses an available space. For instance, if a vehicle pulls into an undelineated parking space that is big enough for two vehicles and parks in the very center of the space so that another can not fit, the vehicle can be charged a higher rate than if they parked at one end of the available space or another end of the available space such that another vehicle can fit. As another example, a motor bike can be charged at different rate if it is parked parallel to a curb as opposed to perpendicular or angled to the curb. The parking sensors can be configured to measure available space before and after a vehicle has parked that can be sent to a mobile device and utilized in a rate determination.

An advantage of this approach is that a block, such as the block including the four vehicles 101a-101d can be utilized in a mixed use manner. Further, space may be more efficiently utilized. For example, at one time, a truck, a car and two motor bikes can be parked. At another time, 6 smaller vehicles can be parked. At yet another time, 3 vehicles and two motor bikes can be parked.

In a particular embodiment, parking sensor can comprise a camera coupled to a processor executing object recognition software. The camera in conjunction with the object recognition software can be used to recognize available spaces on a street. For instance, one or more cameras that are part of a parking sensor can be positioned over the street between buildings 112 and 113 to take a picture that covers all or a portion of the block. For instance, the sensor including the camera can be mounted to a light poll and utilize power from the light poll. The image recognition software can be used to distinguish between objects, such as vehicles and unoccupied space that is available for parking. Information regarding the available space can be broadcast such that it can be received by a mobile device. The image recognition software can also be configured to isolate the presence of a new object, such as a vehicle and isolate this object from other objects in the image. For example, the image recognition software can be configured to isolate and recognize a shape of a vehicle in a captured image.

In one embodiment, an appearance of a new object, such as a vehicle, can be determined by comparing a previously stored image to a newly taken image. In particular, an image can be generated that includes only major differences between the two or more images that are compared. For instance, common features in two compared images can be subtracted from one another to isolate new added image components, such as the presence of a new vehicle.

In some embodiments, the isolated image components can be utilized in a parking enforcement scheme. For example, the parking sensors including one or more cameras can be configured to relay information to a remote server indicating the presence of a new vehicle that has been detected. The remote server can be configured to match a purchase of parking to a vehicle image. Parking enforcement can involve providing an image or images of cars that have paid for parking and/or cars that have not paid parking. More details of parking enforcement are described with below.

A camera based parking sensor can comprise one or more cameras. These cameras can be mounted above a street, such as street 115. In particular embodiments, the one or more cameras can be one of an infrared camera, a black and white camera, a color camera or a combination of cameras, such as an infrared camera and a color camera. The infrared camera can be used at night while the color camera can that uses visual light could be used during the day.

The one or more cameras can be configured to take still images at some interval or continuous video images. The parking sensor can comprise a memory that stores some amount of image data. The parking sensor can be configured to overwrite old image data after some period. In some embodiments, the parking sensor including a camera can be configured to upload some image data to a remote device prior to it being overwritten. For instance, parking stations 104a and 104b can be configured with an access point to a wide area network that allows information gathered and processed by parking sensors, such as 102a-102j to be uploaded to a remote server.

In a particular embodiment, a combination of parking sensors and cameras can be employed. For instance, a single overhead camera might be employed to cover an area with one or more parking sensors, such as 102a, 102b, 102c and 102d. When a parking sensor detects a change in status such as a space going from unoccupied to occupied, the sensor could send a signal to a camera requesting that a picture be taken. The camera could then take a picture of the newly arrived vehicle. Image data associated with the vehicle could be forwarded to a remote server for enforcement purposes.

In yet other embodiments, the image recognition software utilized with a camera can be configured to recognize markings and other features that are associated with legal and illegal parking. For example, the image recognition software can be configured to recognize driveways as not being available for parking and not report as an available space. Further, the image recognition software can be configured to recognize markings, such as curb painted a particular color, to indicate illegal parking. For instance, the image recognition software can be configured to recognize a bus stop marked red and not report it as available parking.

In particular embodiments, mobile devices, such as a mobile device 100 located in vehicle 101*i*, can be receive information directly from one or more of the parking sensors and output to a user in some format that allows the user to be directed to an available parking space. The mobile device could be but is not limited to a phone or a portable computer of some type, such as a laptop computer, a netbook computer or a personal digital assistant. The mobile device can mounted to the car in some manner, such as on a dashboard or the back of a seat in taxicab.

As an example, the mobile device 100 in car 101*i*, could receive information from parking sensor 102*h* that is space available. The mobile device 100 may receive the information directly from the parking sensor 102*h* or indirectly via a parking sensor that networks with parking sensor 102*h*, such as sensors 102*a-d* or parking station 104*b*. In some embodiments, groups of sensors can be networked together to form local sensor nets. For instance, the parking sensors on a particular block can be linked together, such as sensors 102*a-d*, 102*g*, 102*h* and 102*i*, to form a local sensor net.

Information can be shared among sensors in the sensor net to effectively extend the range of the sensors in the sensor net. For instance, information about the available parking space at 102*h* can be sent to sensor 102*a* directly or via one or more intermediate devices, such as from sensor 102*h* to sensor 102*b* and then to sensor 102*a*. In this example, the broadcast range of sensor 102*h* or the sensitivity of the detector of mobile device 100 may not allow the mobile device to directly receive transmissions from sensor 102*h*. Nevertheless, the mobile device may be in range of sensor 102*a* and thus, learn information about the available parking space from sensor 102*a* that was transmitted directly from sensor 102*h* to 102*a* directly or through one or more intermediary devices. More details of network topology and the configuration of sensor nets are described with respect to FIG. 2.

The information received by the mobile device directly from a parking sensor, such as 102*h*, or via other local intermediary devices, such as 102*a*, 102*b*, 102*c*, 102*d*, 102*f*, 102*g* or 104*b* can be processed by the mobile device and output such that a driver of car 101*i* can be directed to the available parking. For instance, an application executed by the mobile device could be configured to output a local map including the location the available space displayed on the map and the current location of the mobile device. The map can include visual indications of directions such as a line drawn from the current location of the mobile device to the available space proximate to parking sensor 102*h*. The application executed on the mobile device can also be configured to alternately or in combination with the map provide audio directions to the available space, such as 'turn right at the next intersection.' Further details of applications executed on a mobile device that can be utilized with the sensors described herein are described with respect to FIG. 2.

In one embodiment, the mobile device can be configured to determine its current position using a GPS device, such as a GPS device integrated into the mobile device. In other embodiments, the mobile device can be configured to determine its position based upon data received from the one or more parking sensors. For example, based upon signals received from the one or more parking sensors, the application executed on the mobile device can be configured to triangulate or estimate its position in some manner. The parking sensors can be configured to broadcast position information and/or the position of the parking sensors can be recorded when they are installed so when the parking sensor is indentified in some manner, position information associated with the parking sensor can be determined.

In yet other embodiments, a combination of GPS data and data received from the one or more parking sensors can be used to determine a current position of the mobile device. In a city environment, the user of sensor data to estimate position can be beneficial because tall buildings can block GPS signals. Further, the sensor data may allow position to be estimated on non-GPS equipped devices.

Parking Transactions

After a car, such as 101*i*, arrives at an available parking space, such as the space located proximate sensor 101*i*, a transaction to purchase parking can be initiated via a mobile device 100 carried in the car 101*i*. The transaction can be initiated using a parking application executing on the mobile device and utilizing a remote communication interface associated with the mobile device, such as a cellular or radio interface (e.g., Wi-Fi). The remote communication interface can allow the mobile device to communicate with a remote device that is authorized to provide a parking transaction including the purchase of parking.

In one embodiment, the mobile device can be configured to communicate with a parking base station, such as 104*a* or 104*b*. The parking application can be configured to send identifying information to the mobile base station, such as information gathered from the parking sensors, which could include a space identifier, information input and/or stored within the device, such as a space number, license plate number, an amount of parking time to purchase, a parking account number, a PIN, and/or financial information (e.g., a credit/debit card) info.

The PIN can be used to authorize the transaction. For instance, a user can be required to enter a PIN associated with a parking account and/or a PIN associated with a credit/debit account. In one embodiment, a user can possess a pre-existing parking account. The parking account can store a fund amount from which the funds can be deducted for a parking transaction. The parking account can be associated with particular vehicles, such as vehicles that are owned by the user or currently being rented by the user. The parking account can be configured such that parking transactions can only be authorized for the vehicles associated with the parking account. Thus, if a user lost their mobile device, another person possessing the mobile device could be discouraged from purchasing parking associated with another vehicle because the any purchased parking would not be valid for cars other than the vehicles associated with the owner of the mobile devices parking account.

The parking base station, such as 104*b*, can be configured to receive information from the mobile device, validate information, such as parking account and credit information and approve a parking transaction. The parking base station can include a communication interface that allows the parking base station to contact remote devices for the purposes of validating transaction information, such as financial and/or parking account information.

The parking base station can also be configured to upload transaction information to the remote server. User parking account information can be stored on a remote server. After the parking base station approves a parking transaction, it can upload the parking transaction to the remote server. The remote server can receive the information and update a user's account, such as deducting funds from the user's account associated with the transaction.

In a further embodiment, the parking base station and/or the one or more parking sensors can be configured to receive radio information from a source located on the vehicle. For instance, parking base station and/or one or more parking sensor can be configured to read an RFID stag secured within the vehicle. The RFID tag can be configured to broadcast information in response to a signal received from the parking base station or sensors, such as a record locator to a record stored on a remote device where details about the vehicle are stored within the record. A vehicle record including vehicle information, such as a license plate number, can also be stored in the RFID tag and read by the parking sensor and/or parking base station. Information read from an RFID tag or other radio-based device located within the vehicle can be used as part of a parking transaction as well as for enforcement purposes. Further details of using RFID tags and radio-based devices are described in more detail with respect to PCT Application No. PCT/US08/07727 and PCT application No. PCT/US2009/003682 previously incorporated herein.

In another embodiment, rather than using the parking base station, such as 104b, to purchase parking, the parking application can be configured to contact a remote parking server directly via one of the communication interfaces available on the mobile device and initiate a parking transaction similar to the one described above with the parking base station. Thus, the remote parking server can be configured to process parking transactions at locations throughout the city based upon communications with mobile devices located throughout the city. An advantage of this approach is that a parking transaction can be approved without requiring a city to install and maintain a large network infrastructure separate from existing communication networks because the parking transaction utilizes pre-existing networks associated with the user's mobile device.

Another advantage is that the user can purchase parking while remaining in their vehicle. For instance, if it is raining the user could purchase parking without walking to a parking base station initiating a transaction and then returning to their vehicle, which could be desirable to the user. Yet another advantage is that it can be possible to purchase parking while the user is not in the immediate vicinity of the vehicle or a parking base station. For example, a user could arrive in the vehicle 101i at the spot 102h and then the leave the vehicle with their mobile device 100 and go to a remote location in another area without purchasing parking, then, the user could remember that they forget to purchase parking and initiate parking from a remote location.

In some embodiments, it can be possible, via their mobile device, to initiate a purchase of parking from a location that is remote to their vehicle. For instance, parking can be purchased prior to the vehicle actually arriving at a parking space where pre-purchased parking transaction can be completed after the user finds parking. If the user does not find parking, decide not to make the trip, then the pre-purchased parking can be utilized at a later time.

In other embodiments, a user can be required to return to their car and possible move their car to purchase parking. For instance, to initially purchase parking a user can be allowed to purchase parking remotely. However, to renew their parking, the user can be required to return to their car and then move their car to another location before parking for the car can be renewed. Location information gathered from a GPS device located in the mobile device as well as location data associated with or determined from the parking sensors can also be used to determine that the user is now in another location.

The purchased parking can be associated with a particular location or area. Thus, if the user merely walked to a new location and purchased parking without moving their vehicle, the new purchase of parking would not be valid for their vehicle in their old location. During parking enforcement, the parking status of vehicle can be checked including whether it is in a location for which parking was purchased by associating location data with the parking purchase.

In yet other embodiments, the parking application can be configured to determine that a user has stopped and remind them to purchase parking. For instance, the mobile device can include an accelerometer and based upon accelerometer data, as well as other data such as sensor data gathered from the device, the parking application can be configured to make a determination as to whether the mobile device resides in a vehicle that has recently parked. For instance, if the parking application has provided guidance to a particular location and has determined it is now located at the particular location, it can remind the user to purchase parking. When the parking application determines that it is in a vehicle that has recently been parked, it can be configured to generate some reminder detectable by a user to purchase parking, such as a vibration, a sound, visual message, an audio message or combinations thereof.

The parking base station, such as 104a or 104b, can include a wireless access point, such as a Wi-Fi connection, that can be used by the mobile device to communicate with a remote parking server. This type of access point could allow Wi-Fi enabled devices that are not cell phones, such as a laptop computer or an IPod Touch,™ to be used for purchasing parking. Further, many cell phones also provide Wi-Fi capabilities. Thus, the access point can provide an alternate communication path for carrying out the transaction in the event that cellular coverage is poor at a particular location.

In particular embodiments, parking transaction can be generated that allow a user to park in a particular location, such as a particular delineated parking space. In other embodiments, the user can purchase parking for a zone, which can be a particular area within the city. The parking transaction can allow a user to park within the zone for a time period selected in the purchase. This type of transaction can allow a user to purchase parking and then move their vehicle from location to location without purchasing additional parking while their parking transaction is valid.

In particular embodiments, the parking application executed on the mobile device can be configured to keep track of whether or not the mobile device is located in the zone for which parking was purchased and whether the parking transaction is still valid. Further, parking rates can be varied according to whether the parking is limited to a particular space or a particular zone. For instance, a higher parking rate can be charged for purchase of zone parking as compared to parking limited to a particular space.

After a purchase of parking, the parking base station or the remote parking server can send an electronic receipt to the mobile device, such 100, as a record of the purchase. This electronic receipt can be utilized in the case of a dispute. For instance, if the user receives an unwarranted parking violation, the electronic receipt could be used by the user to have unwarranted parking violation rescinded. The electronic receipt could include information, such as a time of purchase, a car for which the purchase, a time period for which the parking is valid and a location or area for which the parking transaction is valid.

Parking Related Promotions

In addition, promotions can be associated with the electronic receipt. For instance, the user can receive a promotion with their receipt that encourages them to use another city service, such as a discount on public transportation available at the bus stop 107 or the bike station 109. The promotions can be related to their parking purchases, such as a bonus amount of time added to their purchase, a discount on the next parking purchase or free parking for some time period. These types of promotion can be used to encourage users to utilize the parking services a city is providing.

In other embodiments, the promotions can involve tie-ins with merchants. From these tie-ins, a city may be able to generate additional revenues that defray the costs associated with implementing the methods and apparatus described herein. For example, merchants can sign up with the city to display advertising which can include promotional information associated with the merchant on the electronic receipt. When as part of a parking transaction, a location is determined, the merchant tie-ins or other city service tie-ins can be location based, such that the promotions are triggered when a parking transaction occurs at a particular location. For instance, a merchant could request that advertising and/or promotion information only be sent to the mobile device from which parking is being purchased when the location associated with the parking transaction is within some distance of one of their stores, such as ¼ mile. The promotions can also be time sensitive, such as a happy hour at local bar from 4 pm-6 pm or a 20% discount at a store only good for only the next hour.

A user receiving such a promotion can be required to show the electronic receipt including the promotional information to receive the promotion. For instance, if the user received a 20% discount from a local merchant that was downloaded to with the receipt, the user can be required to show the message including the receipt to have the discount applied to their purchase. In some embodiments, the receipt including a promotion, such as a 20% discount can be generated with a unique identifier, such as a number or a bar-code that is sent with the promotion in the electronic receipt. This unique identifier could be stored on a remote device that is accessible to the merchant. The unique identifier can be checked at the time the promotion is utilized to determine whether the promotion is valid and whether it has been redeemed. In some embodiments, a promotion, such as a 20% discount, can only be used once or a limited number times and then is no longer valid. The unique identifier can be used as a record locator for a record stored on a remote device to determine whether the promotion has been previously redeemed and to check whether it is still valid.

Parking Enforcement

The electronic receipt can also include information used in a parking enforcement schema. For instance, the electronic receipt can include a unique electronic token. In one embodiment, the mobile device can be left in the car and configured to broadcast information related to the electronic token. A receiver device can be configured to receive the broadcast information and validate the information regarding the electronic token, such as whether it is valid or not valid, and then provide an indication as to whether the electronic token is valid. When the electronic token is generated, information about it can be stored in a remote device, such as a remote server or one of the parking stations, such as 104a and 104b. The receiver device can receive information about the electronic token from the mobile device and then validate it against information stored on a remote server or within one of the parking stations. The electronic token can have a limited lifetime, such as the length of time for which parking has been purchased. Thus, an invalid electronic token can be a token that has expired.

In another embodiment, an inexpensive transmitter can be utilized that is configured to receive a download of an electronic token, such as from a mobile device or a nearby parking station, such as 104a and 104b. In the case of the mobile device, a wired or wireless communication can be used to communicate with the transmitter. The transmitter can be secured within the interior of the car, such as mounted to the dashboard. The transmitter can be configured to receive information regarding a current electronic token and broadcast the information in the electronic token for enforcement purposes.

The transmitter can have a unique identification code associated with it, so that electronic token can be paired with the transmitter. This pairing can be used to prevent the electronic token from being copied and downloaded to another device, such as another transmitter. The electronic token can also be paired other information such as vehicle identification information and license information to prevent it from being utilized in an unauthorized manner. For instance, an authentication of the electronic token can require comparing a location at which it was issued with a current location of the receiver receiving the token information. The electronic token may only be considered valid if it received within some area associated with the location at which is original issued.

In one embodiment, the transmitter can have a button or switch, such as spring loaded button or switch that has to be manually engaged to update the transmitter with a new electronic token. This embodiment can be used so that a person has to be physically present with access to the interior of the vehicle before the electronic token can be updated. In another embodiment, a small display, such as an e-ink display, can be mounted within the vehicle, such as in the interior of a windshield or on a back window. The e-ink display can include a wired and/or wireless interface that allows it to receive a download of an electronic token. The e-ink display can also include a button or switch that has to be manually engaged to update the display with a new electronic token.

The electronic token can be displayed on the display in a combination of numbers, letters, symbols, such as a barcode and combinations thereof. Other information, such as a time of issuance and/or an expiration time can also be output on the display. This electronic token can be read by a passing device, such as a bar-code reader, a camera with image recognition software or visually by a person for enforcement purposes. Again, information about the electronic token can be paired with other identification information, such as a location at which it was issued or a vehicle identifier, such as a vehicle license plate to prevent unauthorized use of the token.

In yet another embodiment, the parking station, such as 104a and 104b can include a printer. An electronic token could be printed as ticket with a bar code or a number/letter combination and output from the parking station. The printed ticket could be placed within the vehicle for enforcement purposes.

Sensor Based Public and Private Services

As previously described, the sensors describes herein can be configured to detect and broadcast real-time information other than parking information. For instance, sensors, such as 103a-103f, are located in various building and building units where public and private services are provided. The services can be related to private services, such as groceries, entertainment, merchandise and hair services or public services, such as postal services or other government provided services. The sensors provided in each building unit can be configured to provide real-time information about the service.

For instance, a sensor could be configured to detect or be configured with information indicating whether the service is available or not, i.e., a business can be closed. This information can be received by a mobile device, such as mobile device 105 carried by the pedestrian or mobile device 100 located in the vehicle 101i. The sensor can be configured to detect how many people are in the unit and determine from this information whether there is a long wait for the service. For instance, a sensor located in post office can be configured to count the number of people entering and the building and determine an estimated wait time based upon the number of people it has counted.

In some embodiments, the sensors can be transmitters that are configured to broadcast real-time information that can be of interest. For instance, the sensors can be configured to receive information for broadcast indicating whether a store, such as a grocery store is very busy and there is a long line at the check out. As another example, a sensor located in a restaurant can be configured to broadcast information whether any tables or available or how long the wait is for a table. In yet another example, a hair or nail salon could provide a sensor that broadcast information regarding whether anyone was available for a walk-in appointment. In another example, a sensor can be configured to broadcast a current status of the establishment, such as a happy hour with discount drinks or a promotion in a store that is immediately available.

The sensors can also be configured to broadcast a link that can be used to locate more information about the establishment. For instance, a sensor in a restaurant can broadcast a link to a device located on the Internet that allows a user to see one or more reviews of a restaurant or a description of the menu. This link can be received by a mobile device, such as mobile devices 100 and 105, from one and more sensors. In response to receiving the link, a mobile device, such as 100 and 105, can be configured to gather additional information from the location on a network indicated by the link and output it in some format that is useful to the user.

In one embodiment, the mobile device located in vehicle 101i can be configured to display information received from a sensor as a label or symbol on a map with some indication of status information received from the sensor. For example, a sensor from a restaurant can be configured broadcast its type, such as Chinese food, and its status, such as open, or a stats us such as 5 minute wait for tables. This information could be received from the mobile device and output in some format, such as an audio format, a visual format or combinations thereof.

The mobile device can be configured with filters such only certain types of information are output. For instance, a person, such as a tourist, that is unfamiliar with an area could drive into an area looking for a particular type of establishment, such as a restaurant or a clothing store in vehicle 101i. As another example, a person, such as a pedestrian 117 can walk into an area. Their mobile device, such as 100 or 105, can be configured with a filter such that only information about restaurants is output from the mobile device. The mobile can be receiving information in other categories, such as parking information from sensors 102a-102f or transportation information, such as from sensors 106 and 108, but after the specified filter is applied it may not be output by the mobile device.

As an example, a user can be driving in the vehicle 101i looking for restaurants. The mobile device 100 can be configured to output only information related to restaurants. At some point, information can be output from the mobile device regarding a restaurant of interest to the user. The mobile device can be configured to receive an input that indicates that the user now wants to look parking. After receiving the input, the mobile device can be configured to stop outputting information about restaurants and start outputting information related to parking, such as available parking spaces.

In another embodiment, the mobile device can be configured to filter information, such that only information about one or more specific establishments is displayed. For example, a user can set the filter of a parking application executing in a mobile device located in their car to only display information in regards to a particular post office or a particular restaurant. Based on this information, the user can decide whether they wish to park or not to park. For instance, a user can travel to area to use a particular post office and set a filter in their parking application accordingly. Prior to parking, the user can receive information indicating the post office is very crowded or not open, which is output via the mobile device. Based upon this information, the user can decide whether to leave the area and abort their trip or whether to find parking.

The mobile device can be configured to store information gathered from various sensors including information that is filtered out and not output. For instance, a user, such as pedestrian 117 can be walking in area with mobile device 105 that is collecting information various from local sensors. The mobile device can be configured with a filter, such that only one type of information is being output. At some point, the user 117 of the mobile device can decide that they are interested in another type of information. The mobile device can be configured receive a selection of the new type of information and search and see whether any information of the new type the user is interested is currently being detected or has been recently detected by the mobile device. The mobile device can then be configured to start outputting information about newly selected type of information.

As an example, a user, such as 117, can enter an area on foot looking for restaurants. As the user walks around in the area, the mobile device 105 can be configured to output any information it has received from local sensors about restaurants. Nevertheless, the mobile device 105 can be receiving other types of information from local sensors, such as information about a grocery store that the user passed on their walk.

At some point, the mobile device 105 can receive a selection indicating that the user is interested in locating a grocery store rather than a restaurant. The local sensor that sent information about the grocery store can be out of range of the mobile device 105. Nevertheless, the mobile device can be configured to determine it has recently detected some information about a grocery and output it in some manner. For instance, the mobile device could be configured to show it detected a grocery store located 4 blocks away and that the information it received at the time indicated that the grocery store is currently open. The user could use this information to return to the grocery store.

Sensor Based Transportation Services

As previously described, the parking services described above can be part of an integrated transportation services that are provided using the local sensors described herein. Transportation sensors can be placed throughout a city to provide real-time transportation information associated with a particular area. These transportation sensors can be associated with various modes of transportation that are available in a particular area. The transportation sensors can be configured to broadcast information that can be received by a mobile device, such as the mobile devices 105 and 100 that are in range of the transportation sensors. Some examples of transportation modes include but are not limited to bus, taxis, parking, bicycle sharing, car sharing, water-based transport (e.g., ferries) and trains.

As an illustration, as the pedestrian 117 and the driver of car 101i enters the area, their respective mobile devices, 100 and 105, can start gathering information from local transportation sensors as well as other types of local sensors. The mobile devices can be configured to execute a transportation application that gathers and processes transportation information received from local transportation sensors. For instance, the mobile devices, can receive information from the bus stop sensor 106, the bike station sensor 108, the car share sensor 110, a train station sensor (not shown) and a taxi stand sensor (not shown), process the information and then output it in a format that is useful to user.

The transportation application can be likened to a more general embodiment of the parking application described above, i.e., the parking application and its functions are one embodiment of a transportation application. Thus, many features described with respect to the parking application can be subsumed into the transportation application described below. Like the parking application, the transportation application can provide data filtering in regards to what data is output by a mobile device executing the transportation application. For example, a transportation application executing on a mobile device can gather information from multiple types of transportation sensors but only output information related to one or more types of transportation specified by a user, such as only taxi information or only car-share and bicycle information. However, like the parking application described above, the transportation application can be configured to store information gathered from local sensors that is not output for some time period. This transportation data can be accessible via the transportation application. For instance, recently gathered transportation information that is has been filtered out, can be accessed when filter settings available with the transportation application are changed.

The sensors can be configured to broadcast information about local conditions relevant to a user of the service. This information can be gathered locally, i.e., directly detected by the sensor, but can also be received from other remote devices and broadcast by the sensor. For example, a bus stop sensor, such as 106, can be configured to detect directly and broadcast information, such as how many people are waiting at a bus shelter or whether the bus stop 107 is crowded, the last time a bus passed, an average time between busses, location information that allows the bus stop to be placed on a map, such as a mapping application available on the mobile device, an expected time for next bus, fare information, bus services available at the bus stop, such as route numbers and network links to additional bus information pertinent to the bus stop, such as route maps and schedule information associated with busses that frequent the bus stop.

The bus stop sensor 106 can also receive information from other sensors or other remote devices. For example, the bus sensor 106 can be configured receive information from one or more upstream sensors on bus route that a bus has just departed a stop and is now approaching and broadcast this information. Further, the bus stop sensor 106 can be configured to detect a bus has just departed the bus stop 107 and notify a downstream sensor that the bus has just departed. In addition, busses can be equipped with transponders that allow their position to be determined. This information can be reported to some centralized bus server that tracks all of the bus positions. The bus stop sensor 106 can be configured to communicate with the centralized bus server and receive bus information that is pertinent to the bus stop, such as an estimated time that the next bus will arrive and information about the bus. The information received from the centralized server can be broadcast by the sensor, such as bus stop sensor 106.

In other embodiments, the bus stop sensor 106 can have capabilities similar to the parking station, such as 104a and 104b, or can be associated with a bus transportation station. For instance, the sensor 106 or the bus transportation station can provide a network access point, such as a Wi-Fi spot, that allows a mobile device to access a remote server, such as the centralized bus transportation server or remote server that provides a plurality of different types of transportation transaction. In yet other embodiments, the bus stop sensor 106 can have transaction capabilities. For instance, the bus stop sensor 106 can enable a purchase of bus fare via a mobile device, such as while the person is waiting for the bus. The transaction can be enabled via a communication between the mobile device and the bus stop sensor 106 or an associated bus transportation station. In addition, as previously described, transactions can be enabled via some remote device, such as bus transactions server, that is capable of communicating with the mobile device directly via a communication interface associated with the mobile, such as data network that is accessed by the mobile device.

In general, transportation kiosks, such as the parking station or the bus transportation station, can be used to provide transactional access to one or more transportation modes. For instance, the parking stations, alone or in combination with a remote device can be configured to enable purchases of bus transportation and parking transportation. As a further example, a kiosk located at the bus stop 107 (i.e., the bus transportation station) can be configured, alone or in combination with a remote device, to allow the purchase of parking, bus transportation or other forms of transportation. Further, a remote transportation server can be configured to support multiple types of transportation transactions, such as transactions involving taxis, parking, buses, car sharing, trains, ferries and bike sharing.

The transportation kiosks may or not include a local interface, such as input devices and a display. In some embodiments, the interface to the transportation kiosk is provided only by a user's portable device. In other embodiments, the kiosk can comprise a local interface, such as a touch screen display, and a printer, and also provide access via a mobile device, such as a user's cell phone.

Like the parking example, as part of a transaction, an electronic token can be downloaded to the mobile device as part of the transaction and used as bus fare. For example, an image of a bar code can be downloaded to the mobile device.

When the user's enters the bus, the bar code can be scanned by a device on the bus and validated allowing the user to pay their fare. Similar purchases could be made for taxis, car shares, bike shares, trains and other forms of transportation Like the parking example, promotions can be implemented as part of the transaction process.

In addition, the bus sensor 106 and/or an associated device similar to the parking station can be configured to enable purchases of transportation that are useable for multiple transportation mode, such as a transportation pass, that can be used to access to access public transportation modes, such as trains, busses, bikes, car shares and combinations thereof for a particular time period. Like the parking example, the passes can be zone dependent, i.e., any mode of transportation within a zone for a particular time period.

In other embodiments, passes can be linked to particular forms of transportation and rates for the passes can be charged according to the forms of transportation that are linked to the pass. For instance, a bus only pass can be purchased for one amount, a bus and train pass can be purchased for another amount, a bike and car share pass can be purchased for yet another amount. Again, a user employing such as pass can be provided a unique electronic token, such as but not limited to an image of a bar-code that is displayed on a display of the mobile device or a physical token, such as a printed ticket, that can be presented to gain access to the various modes of transportation.

In yet embodiments, transportation purchases can be enabled that allow the purchase of private transportation, such as a purchase of taxi fare. As an example, a mobile device can be configured to allow a purchase of a pass enabling unlimited travel by taxi within a particular zone or between multiple zones for a time period. The taxi pass, which can be in the form of an electronic token, can be presented and validate each time a user enters a taxi cab. Information can be sent to a central server that records that the pass has been used and what taxi cab company is redeeming the pass. During the ride, the taxi can be configured to measure usage data, such as distance travelled. When the user exits, the taxi cab, this information can be transmitted and associated with the purchased pass. This process can be repeated each time the pass is used.

The taxi cab services can be provided by multiple taxi cab private companies. After the pass expires, based upon the usage information associated with the taxi pass, such as which cabs redeemed the pass and optionally, more detailed usage information, such as distance travelled, revenue from the purchase of the pass can be split among the entities that redeemed the pass. If the pass is not redeemed before it expires, then possibly all of the participating cab companies can receive a share of the revenues. A similar process can be used to split revenues from a pass that was purchased from multiple modes of public transportation. For instance, if a user bought a train and bus pass and only used the train the pass revenues can be sent to just the train service provided. If the used both the train and the bus, the revenue can be split accordingly.

In a particular embodiment, purchases can be enabled that allow a user to access a mix of both public and private transportation. For instance, a user can purchase a train and a taxi pass that allows the user to utilize either forms of this transportation for a time period within a specific area. As described above, a revenue sharing model can be utilized that allows proceeds from the purchase of the pass to split between the different transportation providers.

Returning to FIG. 1, the bicycle sensor 108 can be configured to provide information about bike sharing, such as whether one or more bikes is available for sharing at the bike station 109, rate information, etc. Similarly, the car sharing sensor 110, can be configured to provide information about the car share, such as whether it is available and for how long it is available, usage restriction and rate information. A taxi stand sensor (not shown) can be configured to be broadcast information regarding how many be people are waiting at a taxi stand, an estimated wait time and a number of cabs waiting.

Sensor Net System

Figure 2:
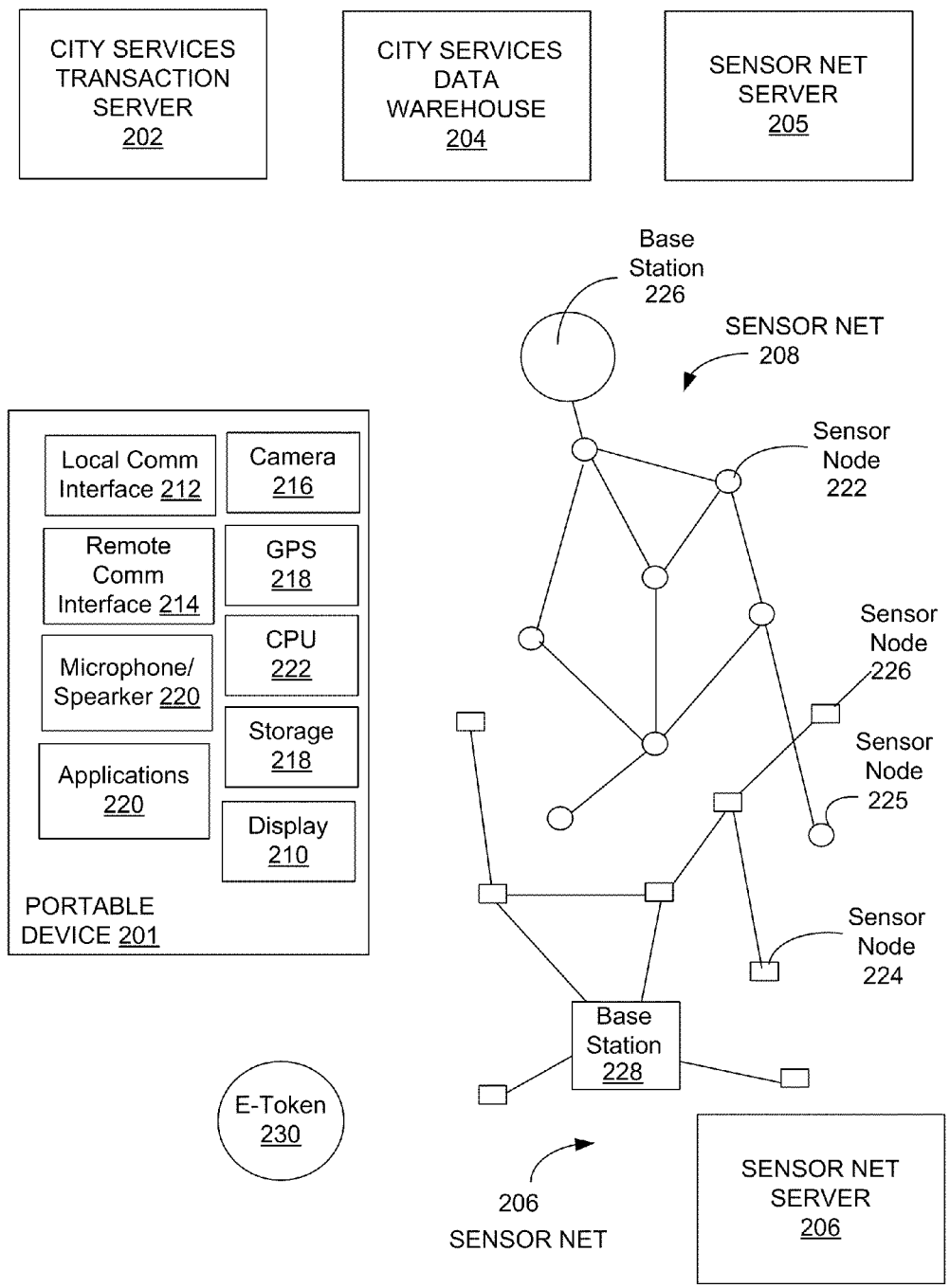
FIG. 2 is an illustration of a system for providing city services comprising a mobile device, sensor nets and remote servers for embodiments of the present invention.

FIG. 2 is an illustration of a system for providing city services comprising a mobile device, sensor nets and remote servers for embodiments of the present invention. The components shown in FIG. 2 are provided for illustrative purposes only and systems with more components, less components and/or different components can be utilized with various embodiments of the present invention. The system comprises a system 202, a city services data warehouse 205, a sensor net server 205, a sensor net server 206, a portable device 201 and an E-token device 230.

Sensor net 206 comprises a plurality of sensor nodes, such as 224 and a base station 228. Sensor net 208 comprises a plurality of sensor nodes, such as 222, and a base station 226. Examples of sensor nodes that can be configured as part of a sensor net are the parking sensors, 102*a*-102*f*, and the sensors, 103*a*-103*f*, associated with services located in various buildings described with respect to FIG. 1. Further details of a sensor node are described in more detail with respect to FIG. 3.

The base stations, 226 and 228, can be configured to gather data from one or more of the sensor nodes in a sensor net and transmit data gathered from the one or more sensor nodes in the sensor net, such as 226 and 228, to a remote server, such as sensor net server 205 or sensor net server 206. A sensor net, such as 206 and 208, can comprise multiple base stations. Examples of a base station, such as 226 and 228, include the parking stations, 104*a* and 104*b*, and the transportation kiosks described with respect to FIG. 1.

In some embodiments, a sensor node can have the capability to act as a base station. For robustness and possible as part of a power conserving measure, a sensor net, such as 205 or 206, can be configurable to change which node is acting as a base station. For instance, if sensor node 222 was configured to communicate to base station 226 and the sensor node 222 was unable to communicate with the base station, sensor node 222 can be configured to switch to a base station mode and notify other sensor nodes in the sensor net that it is now providing this function. In response, other sensor nodes in the sensor net may begin routing communications through the sensor node 222, when it is acting as a base station. While acting as a base station, sensor node 222 can be configured to continue performing the functions of the sensor node, such as detecting information and broadcasting information.

The sensor nets, such as 222 and 224, can be organized in various manners. In some embodiments, a sensor node, such as 222 and 224, can be configured to operate when it detects and broadcasts information. In a particular embodiment, a sensor node can be configured act in a stand-alone mode, such that it does not receive communications from or interact with other sensor nodes or other mobile devices, such as portable device 201. Nevertheless, in the stand-alone, it can be configured to detect and broadcast information based upon its sensor capabilities.

In a particular embodiment, information detected from a sensor node may only be gathered via portable devices, such as 201. For instance, an application executing on the portable device 201 that is configured to receive information from the sensor node can be configured to periodically upload the data to a remote server, such as a city services data warehouse 204. The information that the mobile device uploads can be related to the information it is has gathered from one or more sensor nodes.

The application to gather and process information with the sensor nodes can be downloaded from a remote site, such as an application store like iTunes.™ One condition that a city can impose for allowing access to its sensor nodes via the application is that the application is allowed to gather and periodically report information that it has gathered to a remote server. An advantage of this approach is that it can be possible to gather information from various sensor nodes even when the sensor nodes are not configured to communicate in an interactive manner with other sensor nodes or portable devices, i.e., the sensor nodes are configured in a stand-alone mode.

In other embodiments, the data from a sensor node can be piggybacked on other types of communications. For instance, when the portable device 201 is communicating with a remote server, such as the city services transaction server 202, extra data that is not needed to complete the transaction can be piggy-packed to the transaction. As described above, the application to gather, process information and perform transactions involving data gathered from the sensor nodes can be downloaded from a remote site, and one condition that a city can impose for allowing access to its sensor nodes via the application is that the application is allowed to communicate in this manner, i.e., piggy back extra data to a transaction communication.

In yet others embodiments, a sensor node, such as 222 or 224, can be configured to receive and transfer information to another sensor node. For instance, sensor node 222 can receive information from an adjacent node and then relay the information to the sensor adjacent to base station 226, which forwards the information to base station 226 for transmission to a remote sensor net server, 205. In this example, the sensor nodes can be configured to communicate with other sensor nodes in this manner but may not allow other devices, such as portable device 201, to communicate with them in this manner. Thus, the portable device 201 can be configured to only receive information from a sensor node but not send information to the sensor while the sensor nodes, such as 222 and 224, can be configured to broadcast information that can be received by other devices, such as the mobile device, and possible communicate with other sensor nodes and base stations.

The sensor nodes operating in a sensor net can be configured to organize in a particular structure and share certain types of information. For instance, parking sensors that are located around a square or rectangular city block can be configured to organize in a block sensor net that encompasses the city block. When one of the parking sensors in the block sensor net detects that it is unoccupied, this information can be sent to other parking sensors in the block sensor net, such as sent to adjacent nodes in the block sensor net until each of the parking sensors in the block sensor net knows about any available parking in the block sensor net. The sensor nodes can be configured to detect whether it has already received a message, such as information about available parking at a node, and only forward messages it has not previously received to one or more of its neighbors in the sensor net.

Each of the sensors in the block can be configured to broadcast information about available parking that is detected by the block sensor net. This topology effectively extends the broadcast range of each parking sensor because information can be propagated some distance away from each sensor that is beyond its normal broadcast range. Also, transmissions that can be blocked because of intervening objects, such as a building, can be propagated. For instance, when a line of sight transmission is not available between a mobile device and a sensor node because a building is in the way, information can be propagated around the building, such as around a corner using some type of network topology that allows the information to be propagated to another sensor in the sensor net that is able to establish communications with the mobile device.

Sensor nodes can be organized in various grouping and the present invention is not limited to a block topology. Further, groups can be overlapped, such that a sensor node is a member of two or more groups, so that information can be propagated between groups. For example, sensor node 225 is part of sensor net 208 and sensor node 226 is part of sensor net 206. The sensor nodes in each of the respective sensor nets can be geographically distributed, such that most of the sensor nodes in each sensor net are out of communication range with one another. Sensor nodes 225 and 226 can be within communication range of each other. These sensor nodes can be members of each of sensor nets 206 and 208, so that information can be propagated between the sensor nets.

It can be desirable that information received at a particular location is relevant to that location. Towards this end, the sensor nodes can be configured to limit how far information is propagated. For instance, an original message can be generated with a counter that is added to the message. The counter in the message can be incremented each time it is forwarded from one node to another node. Each sensor node can be configured to only forward messages that have been forwarded a number of times less than some limit. This approach may limit distance a message can travel from its original source.

In another embodiment, each sensor node can store location information about itself, such as its current location. When a message is originated, it can include the location at which it was originated. When the message is forwarded, to another sensor node, it can compare its location to the location in the message and calculate a distance. The sensor node can be configured to only forward the message to other sensor nodes in the sensor net if the distance is below some cut-off value.

In some embodiments, some sensor nodes in a sensor net can be configured to detect information and forward it to other sensor nodes but not broadcast the information to portable devices. For example, if the parking sensors around a city block are organized in a block sensor net, it may be sufficient to only broadcast parking information from the parking sensor nodes at the corner. The other parking sensor nodes in the block sensor net can be configured to only detect and send information to the corner nodes in the block sensor net, but not broadcast this information in a manner that allows it to be necessarily received by a portable device, such as 201. If one of the corner nodes stops broadcasting, then the block sensor net can be configured to detect this event and reconfigure another parking sensor node to act as a 'spokesman' for one or more nodes in the block sensor net. In another example, the parking sensor nodes can range can overlap sufficiently that it makes sense to alternate which nodes broadcasts the available parking information for the block sensor net. This type of scheme may be useful as a power saving measure.

In general, sensor nodes can be configured to route information to base stations. Information can be forwarded to a base station through one or more sensor node hops. The sensor node can comprise logic that allows it to route the information so that it is received at a base station. Also, sensor nodes can be configured to propagate information within the sensor net. When a sensor node receives a message from another sensor node, the sensor node can be configured to determine whether to forward it or not to other sensor nodes. As described above, propagation of information in sensor net can be limited by applying a limiting criterion, such as limiting a number of hops a message can be forward or by limiting an actual distance that the messages travel by comparing a current location of a sensor node receiving the message with a location at which the message was originated.

In addition, sensor nodes can be configured to receive information detected at other sensor nodes and then broadcast this information. Thus, a sensor node can be configured to broadcast information it has detected as well as information that other sensor nodes has detected. Thus, when a sensor node receives information from another sensor, it can be configured to determine whether the information is new or not. As information is propagated through a sensor net, it can be possible that a sensor node receives an identical message from different nodes. When the sensor node receives a message it can determine the node from which it was sent and check whether it currently store any information concerning this node. When the sensor node determines that it does not store any information concerning the node identified in the message, it can store the information and possibly begin broadcasting information associated with this node. When the sensor node determines, it already has received the information associated with the node, it can be configured to ignore the message.

Prior to broadcasting the information it has received from another sensor node, a sensor node can be configured to check how far away the message originated. When the distance is above some cut-off value, the sensor node can be configured to not broadcast information contained in the message. Also, the sensor node can be configured to associate a broadcast life-time with information. For instance, when a message is generated and sent out from a sensor node, it can include a time at which it was generated. A sensor node receiving this message can be configured to only broadcast the information in the message for some period based upon the time that the message was originated. Also, the sensor node can be configured to periodically perform status checks on the information it is broadcasting and stop broadcasting information after a certain time period based upon when a time that the information was originated.

Finally, information broadcast by a sensor node from another sensor node can become inaccurate when a status change occurs. For instance, a first sensor node, such as 222, can detect an existence of an available parking space and its location. Then sensor node 222 can send out this information to other sensor nodes in the sensor net, which then begin broadcasting this information. For instance, sensor node 225 can begin broadcasting this information. At a later time, the sensor node 222 can detect that the space is now occupied. The sensor node 222 can send out a message indicating the status change to other sensor nodes in the sensor net. In response to receive this message, sensor nodes, such as 225, can stop broadcasting the information received from sensor node 222 regarding the available space.

Thus, in general, a first sensor node can be configured to receive a first message from a second sensor node and begin broadcasting information received from the second sensor node. Then, the first sensor node can be configured to receive a second message from the second sensor node that contains new information. In response, the first sensor node can be configured to stop broadcasting information associated with the second sensor node or it can be configured to replace the information previously received from the second sensor node and begin broadcasting the new information.

The city services data warehouse 204 can be gathering information from multiple sources distributed throughout a city. For instance, the city services data warehouse can be storing gathered from multiple sensor nets in formatting it in a manner that allows it to be accessible. In a particular embodiment, the date warehouse 204 can be receiving transportation related information from multiple sources, such as busses, trains, bikes, car-share vehicles, taxis and ferries. The data warehouse can be in communication with mobile devices, transportation kiosks and sensor nodes to provide transportation information that is relevant to a particular location.

As an example, a sensor node or transportation kiosk located at bus stop can be configured to communicate with the data warehouse 204. The data warehouse 204 can be receiving information, such as location information from busses throughout the city. The date warehouse 204 can be configured to determine based upon the location of sensor node and/or route data associated with the bus stop information that is relevant to the bus stop and then send this information to the sensor node and/or transportation kiosk at the bus stop so that it can be broadcast via the sensor node and received via mobile devices that within broadcast range of the sensor node located at the bus stop.

Besides relevant bus data, the data warehouse 204 can determine transportation information for multiple transportation modes that are available proximate to the bus stop. For instance, the data warehouse 204 can be receiving information related to trains, taxis and bikes throughout the city. Based on the location of the bus stop, the data warehouse can be configured to determine transportation information that is relevant to the area proximate to the bus stop. This information can be sent to the bus stop and broadcast via a sensor node or transportation kiosk located at the bus stop. Using this information, a user of a mobile device executing a transportation application can use the transportation application to formulate a transportation solution.

In another embodiment, the data warehouse 204 can be configured to receive location information from a mobile device, such as 201. The mobile device 201 can determine location information from a satellite system, such as GPS, cellular information, such as location information from a cell tower which the mobile device communicates and/or can be based upon information gathered by the mobile device from one or more sensor nodes. In response to receiving the location information, the data warehouse can provide information regarding one or more transportation modes that are relevant to the location provided by the mobile device 201.

The mobile device 201 can be configured to request information related to particular transportation modes, such as taxis or bikes. If the request sent by the mobile device 201 is only for particular transportation modes, the data warehouse can be configured to only provide information in response that is relevant to the requested transportation modes and send this information to the mobile device.

The mobile device 201 can receive information from the data warehouse 204, such as but not limited to locations of local transportation modes, availability of the transportation mode, such as a bus is approaching in 5 minutes, and rate information. This information can be output by the mobile device 201 in a manner that allows a user to make an informed transportation decision. For instance, the mobile device can highlight the location of a bus stop, a user's current position and information indicating a bus is approaching in five minutes, a location of a train station and information that the next train arrives in 10 minutes.

The mobile device, such as 201, can include components such as but not limited to one or more local communication interfaces, such as a local communication interface 212, a remote communication interface 214, audio components, such as a microphone/speaker 220, a memory storing applications, such as 220, a camera 216, a GPS receiver, a CPU 222, additional memory 218 and a display 210. The remote communication interface 214 can be configured to allow the mobile device access an available cellular and data network. The local communication interface can be configured to allow communication with local devices, such as sensor nodes and base stations. One local communication interface can be Wi-Fi and another is Bluetooth.™ In particular embodiments, the local communication interface can allow communication with devices, such as sensor nodes, using Zigbee, which implements an IEEE 802.15.4 communication standard. More details of sensor nodes are described with respect to FIG. 3.

Mobile device 201 includes camera 216. Camera gathered information can be used as part of the transactions described herein. For instance, as part of a parking transaction, previously described, a user can take a picture of a parking space number, such as a stall number. Further, the user can take a picture of a vehicle license plate or other unique vehicle identifier. For instance, a symbol, such as a bar-code can be placed inside of a vehicle and user can take a picture of this bar-code as part of a parking transaction. In another embodiment, a user can be requested to take a picture of the user's face or the user's hand as part of a transaction. This information can provide a biometric record that is used to authorize or later dispute a transaction.

Information gathered mobile device, such as but not limited information gathered from the camera 216, GPS 218, cell phone tower information and information received from sensor nodes can be sent by the mobile device 201 to the city transactions server 202 to initiate a transaction. The mobile device 201 can communicate with the city transactions server via the local communication interface 212. The city transaction server 202 can be configured to provide transactions in multiple areas through out a city. Some previously described transactions that can be initiated include but are not limited to a transaction involving a purchase of parking or transportation.

As part of the transaction, the city services transaction server can send an electronic receipt as described with respect to FIG. 1. In one embodiment, the electronic receipt can be a bar-code or other symbol that can be displayed on the display 210 of the mobile device or another display device. The bar-code can be used to gain access to services associated with the transaction, such as bus or train access.

In other embodiments, the electronic receipt can include an electronic token. The electronic token can be transmitted from the mobile device 201 to an e-token device 230, such as an E-token located in a user's car. The e-token device 230 can include a radio transceiver configured to output information associated with a stored electronic token. Also, the electronic token can be stored on the mobile device 201 and transmitted to other devices as needed. For instance, the mobile device 201 can receive an electronic token usable for bus fare that can be detected/received by a device located on the bus. Electronic tokens can be used as part of various enforcement and access schemes, such as a parking enforcement or transportation access.

Sensor Nodes

Figure 3:
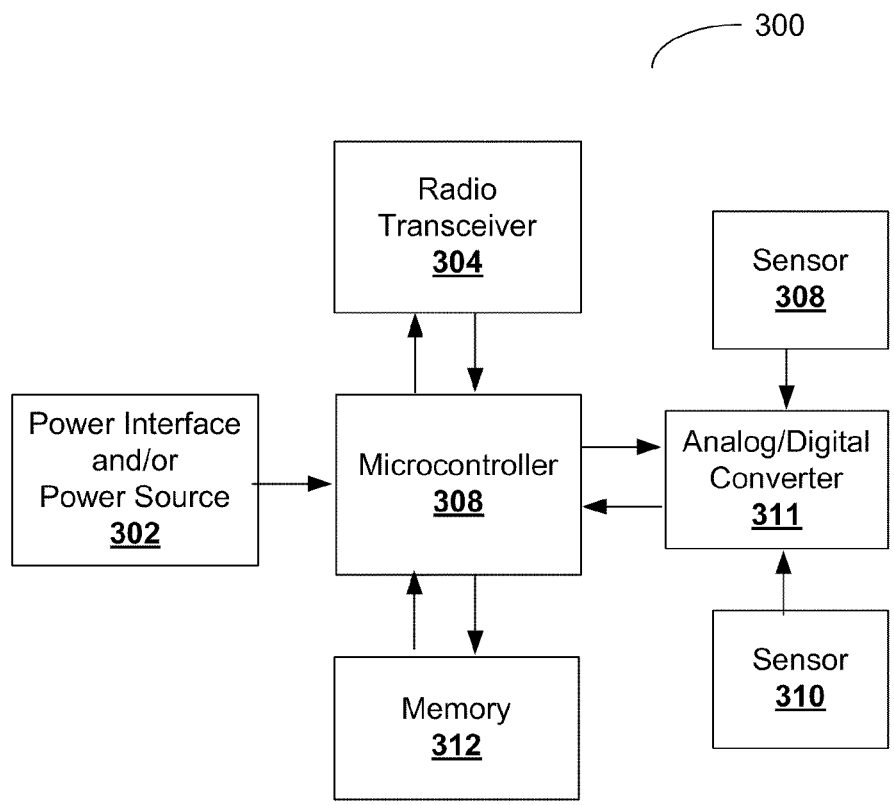
FIG. 3 is a block diagram of a sensor node for one embodiment of the present invention.

FIG. 3 is a block diagram of a sensor node 300 for one embodiment of the present invention. In one embodiment, the sensor node 300 can comprise a power interface and/or power source 302, a radio transceiver 304, a microcontroller 308, a memory 312, one or more sensors, such as 308 and 310, and an analog to digital/converter 311. The sensor node can include an internal power source, such as a battery or a capacitor, and/or can be connected to an external power source, such as power generated from an electric grid or power that is harvested from an environmental source, such as solar power, vibrations or an ambient heat source. The batteries can be rechargeable Power consumption in the sensor node can be used for the sensing and communication and data processing. More energy can be required for data communication in sensor node as compared to sensing and data processing. Two power saving methods that can used are Dynamic Power Management (DPM) and Dynamic Voltage Scaling (DVS). DPM takes care of shutting down parts of sensor node which are not currently used or active. DVS scheme varies the power levels depending on the non-deterministic workload. By varying the voltage along with the frequency, it is possible to obtain quadratic reduction in power consumption.

The Microcontroller 308 performs tasks, processes data and controls the functionality of other components in the sensor node. Other alternatives that can be used as a controller include but are not limited to: a general purpose desktop microprocessor, digital signal processors, field programmable gate arrays and application-specific integrated circuits. The microcontroller can implement an Operating System (OS), such as TinyOS.

TinyOS is based on an event-driven programming model instead of multithreading. TinyOS programs can be composed into event handlers and tasks with run to completion-semantics. When an external event occurs, such as an incoming data packet or a sensor reading, TinyOS calls the appropriate event handler to handle the event. Event handlers can post tasks that are scheduled by the TinyOS kernel some time later. Both the TinyOS system and programs written for TinyOS are written in a special programming language called nesC which is an extension to the C programming language. NesC is designed to detect race conditions between tasks and event handlers.

Sensors, such as 308 and 310, can be hardware devices that produce measurable response to a change in a physical condition like temperature and pressure. Sensors sense or measure physical data of the area that is to be monitored. The continual analog signal sensed by the sensors can be digitized by an Analog-to-digital converter, such as 311, and sent to controllers for further processing. Information generated from the sensors can be stored in memory 312.

Sensors can be passive and non-directional, directional or active. Passive sensors can sense the data without actually manipulating the environment by active probing. These sensors can be self powered, i.e., energy is needed only to amplify their analog signal. There is no notion of "direction" involved in these measurements. Passive, narrow-beam sensors are a type of passive but they have well-defined notion of direction of measurement. A typical example of a passive directional sensor is a camera. Active Sensors can actively probe the environment. A sonar or radar sensor is an example of an active sensor.

In particular embodiments, sensor nodes can include environmental sensors for measure ambient conditions, such as temperature and pollutions levels. A parking sensor node can include both parking related sensor and environmental related sensors. Thus, a parking sensor can also be used to monitor city environmental conditions, such as pollution levels.

Sensor nodes can make use of ISM band which gives free radio, huge spectrum allocation and global availability. Some choices of wireless transmission media include radio frequency, optical communication (Laser) and infrared. Laser requires less energy, but needs line-of-sight for communication and also sensitive to atmospheric conditions. Infrared like laser, needs no antenna but is limited in its broadcasting capacity. Radio Frequency (RF) can be based upon frequencies between about 433 MHz and 2.4 GHz. The functionality of both transmitter and receiver are can be combined into a single device know as transceiver, such as 304. The transceiver can utilize a communication protocol, such as ZigBee, WirelessHART, or 6lowpan/ISA100. These protocols all are based on the same underlying radio standard: IEEE 802.15.4-2006.

Zigbee can utilize 2.4 GHz, 902-928 MHz and 868-870 MHz communication bands. The 2.4 GHz band is used worldwide and has 16 channels and a maximum over-the-air data rate of 250 Kbps. Lower frequency bands are also specified. The 902-928 MHz band serves the Americas and much of the Pacific Rim, with 10 channels and a burst rate of 40 Kbps. European applications use one channel in the 868-870 MHz band, which provides 20 Kbps burst rate. This assortment of frequencies lets applications with the appropriate hardware configuration adjust in real time to local interference and/or propagation conditions. Once on a specific channel, the 802.15.4 radio relies on a number of mechanisms to ensure reliable data transmission, including binary phase shift keying (BPSK) in the 868/915 MHz bands and offset quadrature phase shift keying (O-QPSK) at 2.4 GHz.

ZigBee relies on the basic 802.15.4 standard to establish radio performance. As a short-range wireless standard, 802.15.4 excels in the ultra-long battery life and low transmitter power. The standard specifies transmitter output power at a nominal −3 dBm (0.5 mW), with the upper limit controlled by the regulatory agencies of the region in which the sensor is used. At −3 dBm output, single-hop ranges of 10 to more than 100 m are reasonable, depending on the environment, antenna, and operating frequency band. Instead of pure power, ZigBee augments the basic 802.15.4 simple transmitter and protocol with an extensible, sophisticated network function that allows multi-hop and flexible routing, providing communication ranges that can exceed the basic single-hop. Indeed, depending on the data latency requirements, networks that use dozens of hops, with cumulative ranges in the hundreds to thousands of meters. Networks can have star, cluster tree, or mesh structures; each comes with its own strengths.

Various security schemes can be incorporated with the sensor nodes and networks described herein. IEEE 802.15.4 provides authentication, encryption, and integrity services for wireless systems that allow systems developers to apply security levels as required. These include no security, access control lists, and 32-bit to 128-bit AES encryption with authentication. This security suite lets the developer pick and choose the security necessary for the application, providing a manageable tradeoff against data volume, battery life, and system processing power requirements. The IEEE 802.15.4 standard doesn't provide a mechanism for moving security keys around a network. The ZigBee security toolbox consists of key management features that let you safely manage a network remotely.

A parking sensor is one example previously described with respect to FIGS. 1 and 2. In reference to FIG. 3, the parking sensor can comprise one or more sensors to detect the presence of a vehicle in one or more embodiments. The sensor node 300 can include a body or casing of some type (not shown). The sensor, such as 308 and 310, can be secured to the body of the parking sensor in various ways. For example, the sensors can be attached to the exterior surface of the body or may be embedded into exterior surface of the body. In some embodiments, the sensors can be embedded or attached such that a portion of each sensor protrudes or is external to the exterior surface of the body. In other embodiments, the sensors can be secured internal to the body (i.e. held within the body) such that no portion of a sensor is exposed. It is contemplated that individual sensors can be secured by various structures, mounts, fasteners, adhesives, or a combination thereof. In one embodiment, the sensors can be secured by a rotating or pivoting mount which allows the sensors to be pointed in a particular direction or angle.

The sensors of parking node sensor can detect the presence of an object within a parking space by emitting one or more detection beams which may comprise acoustic, electromagnetic, radio frequency, or light (including non-visible, such as infrared heat) energy. The beams can be directional or omni-directional. A logic device, such as 308 can be used to determine the presence of a vehicle within a parking space based on the detection of one or more objects by the sensors, such as 308 or 310. Generally, the reflection of a detection beam off an object can allows the sensors to detect the object's presence. It is noted that detecting an object can include detecting the presence of a motor vehicle or parts thereof as well as detecting the presence of other physical objects. In addition, one or more of the sensors can be passive sensors which detect vehicles without emitting any detection beams.

In a particular embodiment, the sensors 108 can be acoustic sensors which detect the sound of a vehicle, or the sensors may be radio frequency or electromagnetic sensors which detect changes in surrounding radio or electromagnetic energy due to the presence of metals or other materials in a vehicle. The passive sensors can also detect physical contact or movement, such as physical contact with a vehicle or movement of the pavement (including pressure) due to the presence of a vehicle. The passive sensors can also detect the weight of a vehicle in one or more embodiments.

It is contemplated that any type of sensor, now known or later developed, which is capable of detecting the presence of an object can be used. In addition, one or more different types of sensors can be used on a single sensor node, such as parking sensor node, if desired. The ability to have multiple types of sensors can be advantageous in that readings from the various types of sensors can be used to verify the presence of a vehicle such as by comparing the readings from the various sensors. As is known in the art, different types of sensors can have different detection ranges and capabilities and may be chosen to suit different environments, vehicles, or other conditions.

Interactions Among System Components

Figure 4:
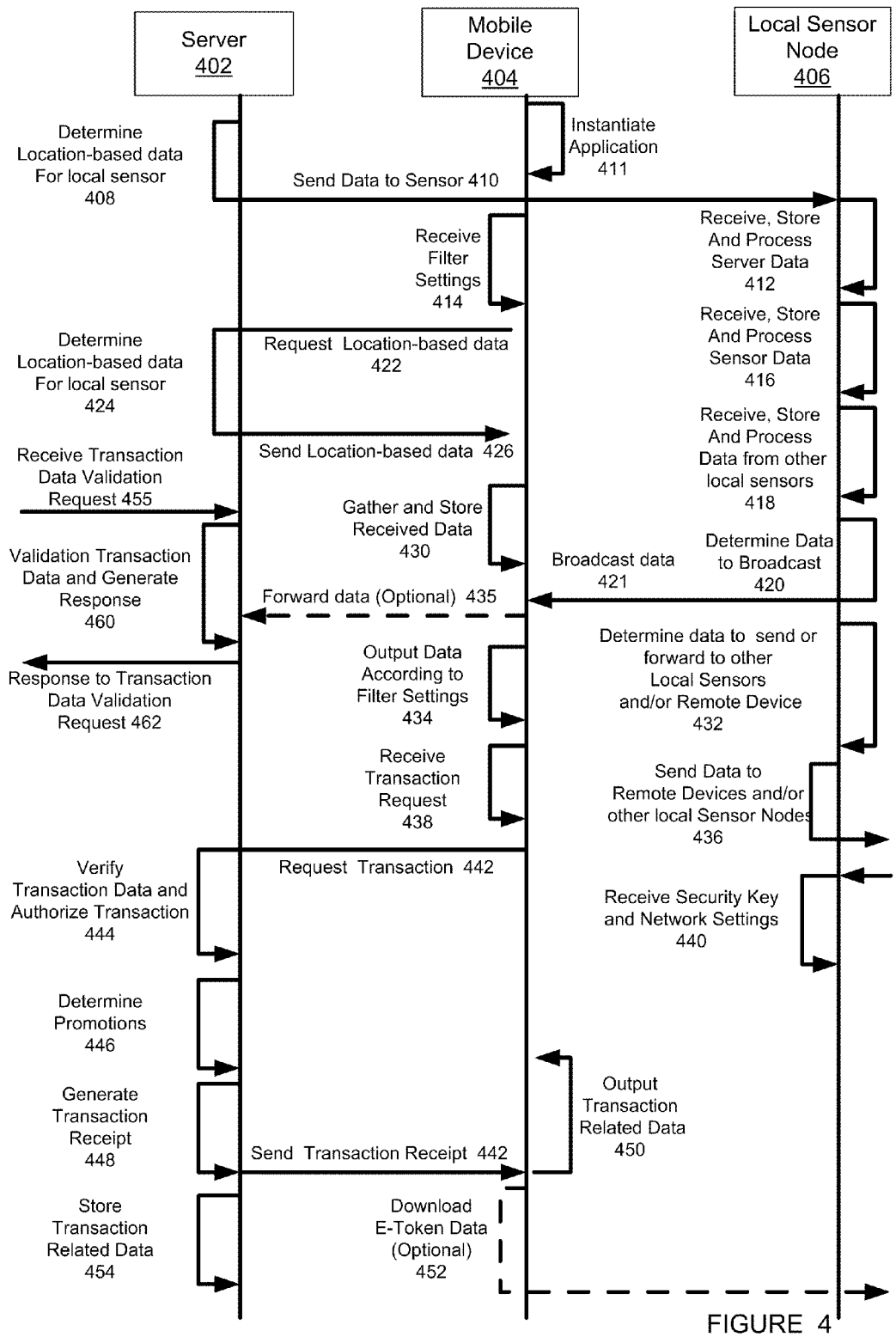
FIG. 4 is an interaction diagram comprising a sensor node, a server and a mobile device.

FIG. 4 is an interaction diagram comprising a sensor node 406, a server 402 and a mobile device 404. In various embodiments, one or more servers can be employed to implement various functions described herein and the present invention is not limited to a single server. For example, one server can be configured to perform transactions, disseminate location relevant information to various sensor nodes and gather/store data from various sensor nodes. In another embodiment, these functions can be performed by separate servers. In other embodiments, a single function can be implemented using multiple servers. For instance, multiple servers can be dedicated to performing a single function, such as parking transactions. Thus, the following description is not meant to be limiting to a particular architecture and is provided for illustrative purposes only.

As previously described, a local sensor 406 can act in a stand-alone mode. In a stand-alone mode, the local sensor can be configured to process data from one or more sensors and broadcast information about the sensor data it has collected. It can also be configured to broadcast information about its position. The information can be its actual position or an identifier associated with the sensor node where a record indicating the sensor node's position can be accessed via the identifier. The position information can allow another device, such as the mobile device 404 to determine its position. For instance, the mobile device can be configured or a device in communication with the mobile device can be configured to determine a location of the mobile device by analyzing position data that the mobile device has received from multiple sensor nodes. An advantage of this approach is that can work indoors, such as in a parking garage where GPS signals are not available.

In other embodiments, rather than broadcasting information, the local sensor node 406 can be configured to send information to specific devices in a network of devices associated with the sensor node. In various embodiments, the local sensor node can be configured to send information to other local sensor nodes, mobile devices, such as 404 and remote devices, such as server 402. In some embodiments, information addressed to a particular device can be sent indirectly through multiple intermediary devices. For instance, information detected by local sensor node 406 can be sent to a remote server, such as 402, via one or more hops involving other sensor nodes or even a mobile device, such as 404, acting as a temporary node. In 432, the local sensor node can determine data to send or forward to other local sensor nodes, mobile devices and/or remote servers. In 436, the local sensor node 406 can send data to remote devices, such as 402 or 404, and/or other local sensor nodes.

As described in the previous paragraph, the mobile device 402 can be configured to act as a temporary node in a network. The mobile device 402 is referred to as a temporary node because as it travels through a particular area, it can move in and out of communication range with various sensor nodes. Nevertheless, when in range of a particular sensor node or having previously been in range of the particular sensor node, it can be used to send information received from the particular sensor node, while it was in range, to a remote device, such as server 402. In 435, the mobile device 404 forwards information to the server 402. This information can have been received from the local sensor node 406 in 421 as broadcast information. In other embodiments, the mobile device 404 can forward information to the server as part of a transaction request. For example, data gathered from one or more local sensor nodes can be sent as part of a transaction request 442 sent from the mobile device 404 to the server 402 where all of the data sent in the transaction request may not be related to the transaction, i.e., extra data can be piggy-backed on the transaction.

In a particular embodiment, the local sensor node 406 can be configured to broadcast extra information that is not output by an application running on the mobile device but is still being detected by mobile device. For instance, a local sensor node, such as 406, can be configured to detect local environmental conditions, such as air quality, as well as to detect available parking. The local sensor node can broadcast information about the parking and the environmental information where the environmental information can be piggy-backed to the parking information. The application running on the mobile device can be configured to process both sets of information, output the parking information, which is of interest to the user and forward the environmental information to a remote device, such as server 402, which can be of interest to other users, such as a local government. While the parking application is running on the mobile device 404, the user of the application may not be aware that their mobile device is being used to process and forward the information related to the environmental conditions.

In other embodiments, an application instantiated by the mobile device 402, such as the application instantiated in 411, can be configured to broadcast information that can be received by local sensor nodes, such as 406, that it is available for communications. This application, such as a parking or transportation application, can have been downloaded to the mobile device 404 from a remote device, such as server 402. The local sensor node, such as 406, can be configured to detect the presence of a mobile device that is available and establish a communication link with the available device. Then, the local sensor node 406 can be configured to determine a package of information to send to a remote device, such as the server 402 via the mobile device 404 and send it. This process can be going on in the background and a user of the mobile device may not be aware that these communications are occurring. A local government may strike to a deal with local network providers that allows information of this type to be sent for free, so that an owner of the mobile device 404 is not charged for allowing their mobile device to be used in this manner.

When the local sensor node 406 is configured to use a mobile device 404 as a temporary network node, the local sensor 406 can be configured to develop a queue of information for transmission to a remote device via the temporary node. This queue can be built up while the local sensor node is waiting for temporary node to come into range. When an available temporary node is detected, the local sensor node 406 can be configured to send some or a portion of information it has accumulated in its queue to the temporary node, via one or more communications, with the temporary node.

Returning to FIG. 4, as previously described the local sensor node 406 can be configured to receive data from various sources. For instance, in 408, a remote device, such as server 402 can be configured to determine location-based data that is appropriate to a local sensor node, such as 406. The location based information can be information that can be of interest to a user of a mobile device, such as 404, that is in communication range with the local sensor node, such as 406. For example, a local sensor node located at a bus stop can be configured to receive bus status information from a remote device, such as 402. In 410, a remote device, such as server 402, can send data, such as location-based data to a local sensor node, such as local sensor node 406 for broadcast purposes.

In 412, the local sensor node can receive, store and/or process data sent from a remote device, such as server 402. In 416, the local sensor node 406 can receive store and/or process data from one or more sensors associated with the local sensor node (e.g., see FIG. 3). In 418, the local sensor node 406 can receive, store and/or process data from other local sensor nodes. Although not shown, the mobile device 404 can also send data to the local sensor node 406. In 420, the local sensor node can be configured to determine whether to broadcast information that it has received from one or more of its sources, such as the remote server 402, other local sensor nodes, its own sensors and mobile devices, such as 404. The determination can involve such factors as checking the integrity of the data and determining whether the data is currently relevant for the particular time and location of the local sensor node.

After a determination is made to broadcast information, it can be formatted and broadcast in 421. In some embodiments, all or a portion of the broadcast data can be encrypted. For instance, piggy-backed data can be encrypted while non-piggy backed data might not be encrypted. To allow for encryption, the local sensor node 406 can be configured in 440 to receive security key and other security related information as well as network setting from a remote device, such as but not limited to server 402. The network setting information can comprise but is not limited to information, such as one or more local sensor nodes that can be used as an intermediary device to send information.

As described above, the local sensor node can be configured to receive information from multiple sources. All or a portion of this information can be broadcast by the local sensor. In other embodiments, all or portion of the information received in 412, 416 and 418 can be sent/forwarded to other devices. In 432, the local sensor 406 can determine data to send or forward to other local sensors and/or remote devices. For instance, the local sensor node can be figured to send, via one or more intermediary devices, data it has collected from its sensors. In one embodiment, data can be uploaded for archival purposes and then later deleted from the local sensor node. The local node can also act as an intermediary device. In 436, it can send data to other remote devices, such as but not limited to other local sensor nodes, mobile devices, such as 404 and remote devices, such as 402.

In 411, the mobile device 404 can instantiate an application, such as a parking locator application or a transportation application, that allows it to receive data from one or more local sensor nodes, other mobile devices, remote devices, such as server 402 and combinations thereof. The communication can be a direct communication between the mobile device and local sensor node. For example, in 421, the mobile can receive location based data broadcast from one or more local sensor nodes, such as 406, in communication range with the mobile device. In another example, the mobile device 404 can be configured to receive location based data gathered from other mobile devices that are in communication range of the mobile device 404, i.e., located within some proximate area. Thus, in some embodiments, mobile device 404 can be configured to share location based information with other mobile devices in the area.

In another example, mobile devices, such as 404, can be configured to receive location-based information and other types of information from a remote device, such as server 402. In one embodiment, this information can be sent to the mobile device in response to a request for location based data sent to the remote device, such as server 402, from the mobile device in 422. In some instances, the mobile device can forward the location related information it has gathered and the determination of its location can be made or verified by the remote device, such as server 402.

In another embodiment, in a peer-to-peer network configuration, the mobile device can be configured to request location-based information from other mobile devices that are in range of the mobile device 404. The request can include a location of the requesting mobile device, such as a location determined from GPS data, cell data, local sensor node data or combinations thereof. In 422, the request can also include requests for specific types of data, such as merchant data or transportation data. The mobile device can include an interface for selecting specific types of data to gather from remote sources, such as the server 402 or the local sensor node 406 and specific types of data to output. The selections of the data that is gathered and the data that is output do not have to be the same. In 414, these selection can be input as filter settings related to data gathering and data output.

In 424, the remote device, such as server 402, can determine appropriate location-based information and, in 426, send it to the mobile device 404. The remote device, such as 402, that is providing the location-based information can contact one or more other devices to gather information. For instance, particular servers can store information related to specific types of information, such as transportation, local services and local merchants, and the remote device can be configured to contact one or more of these other devices to gather needed information and then forward it to the mobile device requesting the information.

In one embodiment, the information sent to the mobile device 404 in 426 can include location-based promotions or advertising. For instance, the server, in 446, can be configured to determine that a merchant within some distance of the location determined for the mobile device 404 is offering a promotion and send data that allows information about the promotion to be output at the mobile device, such as outputting information about the location of the promotion and its nature to a display. Filter setting input by the user in 414 can be used to determine whether promotions/advertising are sent to the mobile device or not, types of promotions that are sent to the mobile device and/or whether promotions are output. In other embodiments, the application instantiated by the mobile can be configured to output certain information, such as promotions and advertising independent of a user's wishes specified by their filter settings.

In 430, the mobile device can gather and store received data. The received data can be from remote devices, such as server 402, local sensor nodes, such as 406 and other mobile devices. In 403, the mobile device can be configured to store data not specified by current filter settings to allow for this data to be retrieved at a later time if the filter setting input in 414 are changed.

In 434, the mobile device can be configured to output one or more different types of information. This information can be output according to the filter settings received in 414. For instance, the mobile device can be configured to receive information about an available parking space and output directions from the current location of the mobile device to the location of the available parking space. The information can be output in a visual format, an audio format or combinations thereof. As another example, the mobile device can receive information about a sale at a particular merchant and provide directions from the current location of the mobile device to the merchant location. If the mobile device user was in a car, the mobile device could be configured to provide directions to the nearest available parking relative to the merchant location.

In one embodiment, the mobile device can be configured to store information according to location. For instance, information that is gathered can be stored according to locations along a route that the mobile device has travelled. In some embodiments, this route based information can be sent to or shared with other devices. For instance, a first user can find all of the merchants of a specific type along a particular route using a first mobile device and then forward this information to a second mobile device where a second user of the second mobile device can then follow the route provided by the first user. The second user can also utilize the information gathered by the other user, such as available sales or promotions related to the merchants. As another example, a user of a first mobile device can provide air qualities reading along a certain route and then forward them to a second mobile device. The user of the second mobile device can then decide to follow or not to follow the route provided by the first user based upon the air quality readings.

Mobile devices, such as 404, can be used to perform various transactions. For instance, a mobile device can be used to purchase parking or transportation access. In 438, the mobile device can receive an input indicating a request for a transaction, such as a transaction to purchase parking. In 442, a mobile device, such as 404, can be configured to send the transaction request to a remote device, such as 402. In 444, the remote server can verify transaction data and authorize the transaction. The verification and authorization can include locating an account associated with the transaction, determining whether the account is valid, verifying financial information, verifying location information (e.g., if the transaction is location specific, it can be desirable to verify that a correct location for the location has been determined), verifying identification information that can associated with an account, such as a PIN or a password, deducting funds for the transaction from an account or receiving an authorization from a remote account, requesting and verifying biometric information, such as a photo of the user, requesting other verification information, such as a current picture of a car's license plate. Thus, in 444, multiple communications can occur between the mobile device and the server 402.

One advantage of using a mobile device to perform a transaction in the manner described above is related to user privacy. In the methods described herein, the mobile device can be used to gather data from one or more local sensor nodes without its location being revealed. As previously described, the mobile device can be utilized in a moving vehicle to obtain parking. In the case of parking, the location of the mobile device may not be revealed until the user wishes to perform a transaction. Otherwise, the position of the mobile device of the user can remain undetected and the user can travel unmonitored. This approach differs from other methods where the car includes an identifier, such as a transponder or a GPS tracker that allows its position to be constantly monitored.

In 446, the server 402 can determine whether there are any promotions or advertising to be added to the transaction. For instance, a promotion can be associated with the nature of the transaction, such as free parking for a parking transaction, or can be associated with the transaction information, such as a location of the mobile device that is initiating the purchase. In 448, a transaction receipt can be generated, the transaction receipt can include information, such as a unique identifier (e.g., an e-token), that can be used to validate and possibly enforce conditions associated with the transaction. The transaction receipt can also include unique identifiers associated with a promotion. The transaction receipt can be sent to the mobile device in 442. In 450, the mobile device can be configured to output transaction related data, such as a confirmation of the transaction and promotions/advertising sent with the transaction receipt.

In 454, information related to the transaction can be stored for dispute resolution as well as transaction enforcement. For instance, an electronic token can be associated with a transaction, such as a purchase of parking and sent with the receipt in 442. This electronic token can be a unique number or a unique symbol associated with the transaction, which in some instances can be sent as an image. In 452, the e-token information can be downloaded to a device separate from the mobile device, such as wireless transceiver located in a car, a display located within a car or a printer associated with a kiosk where the e-token information is output to a printed ticket. E-token information can then be read from another device.

E-token information can be sent to a remote device, such as 402, storing transaction information. In 455, the remote device, such as 402, can receive a request to validate transaction information. In 460, the remote device can validate the transaction information and generate a response. For instance, the remote device can determine whether information regarding an e-token is associated with a valid token issued by the server. Then, the server can check whether conditions that can have been associated with the token when it was issued are still valid. For instance, a token can have been issued that is only valid for a certain time period. Thus, the server can check whether the token has expired. As another example, a token can issued that is only valid in a particular area or location and the server can be configured to determine whether a device associated with the e-token is at a valid location. In yet another example, an e-token valid for a promotion, such as a discount at a merchant, can be valid for only a single use and the server can check whether the e-token is valid and whether it has been redeemed yet. In 462, a response to a requesting device can be sent in regards to the validity of a token.

The various aspects, embodiments, implementations or features of the invention can be used separately or in any combination. The invention can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

Status Nodes and Internal Sensor Nets

As described in the previous paragraphs, one or more sensor nodes can be configured to provide current status information associated with a particular entity, such as a retail merchandiser, retail service provider or a government office. In particular embodiments, the current status information is broadcast locally so that a person in the general vicinity of the entity receives current status information. The current status information can be received from a status node associated with the entity. The current status information can affect a real-time decision by the user such as whether to obtain parking or not or whether to enter an establishment associated with the entity. In particular embodiments, the current status information is derived from an internal sensor net.

Figure 5A:
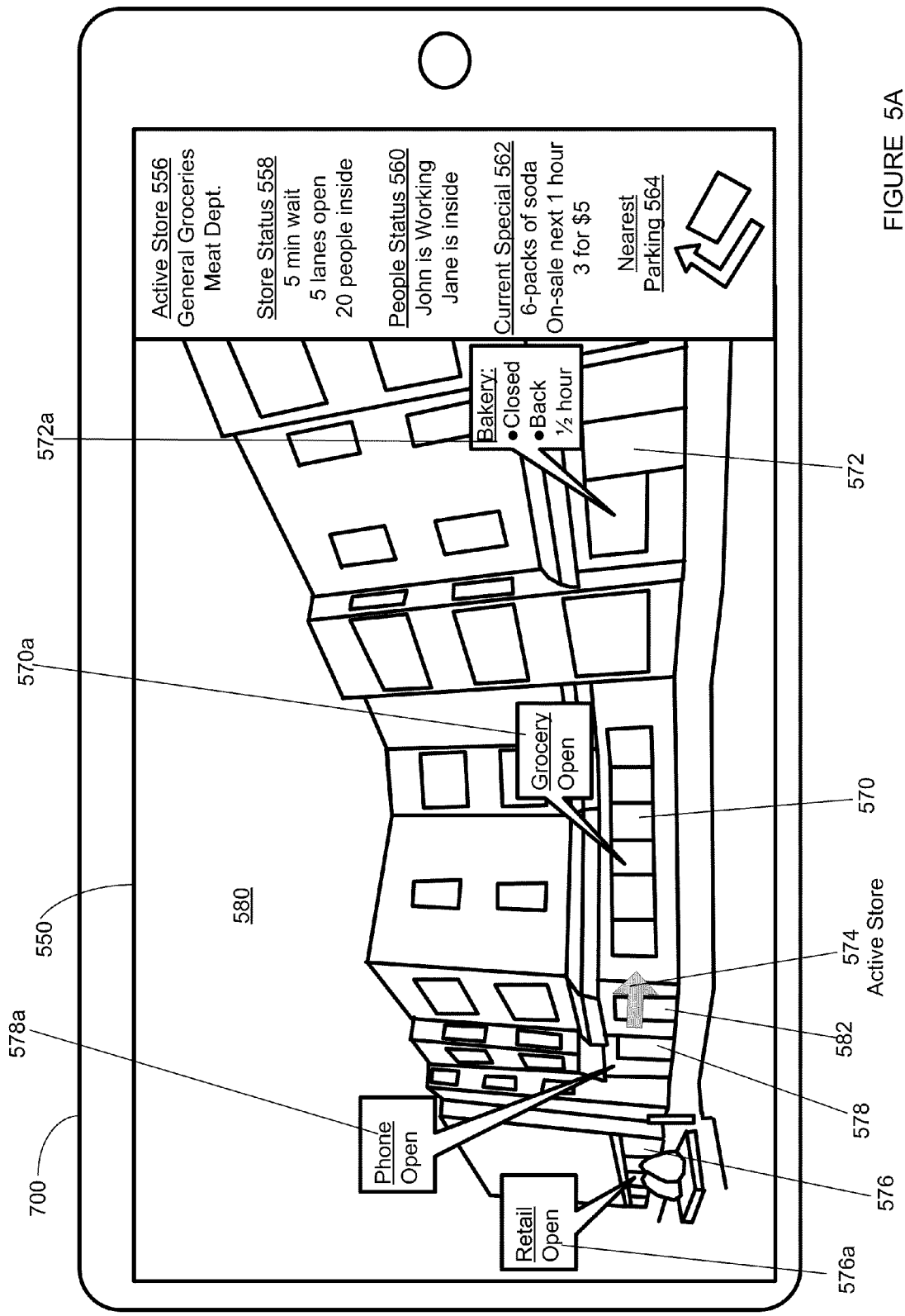
FIG. 5A is an illustration of an interface on a mobile device for viewing data from one or more status nodes associated with various service providers.

With respect to FIG. 5A, an illustration of an interface on a mobile device for viewing data from one or more status nodes associated with various service providers is described.

Figure 5B:
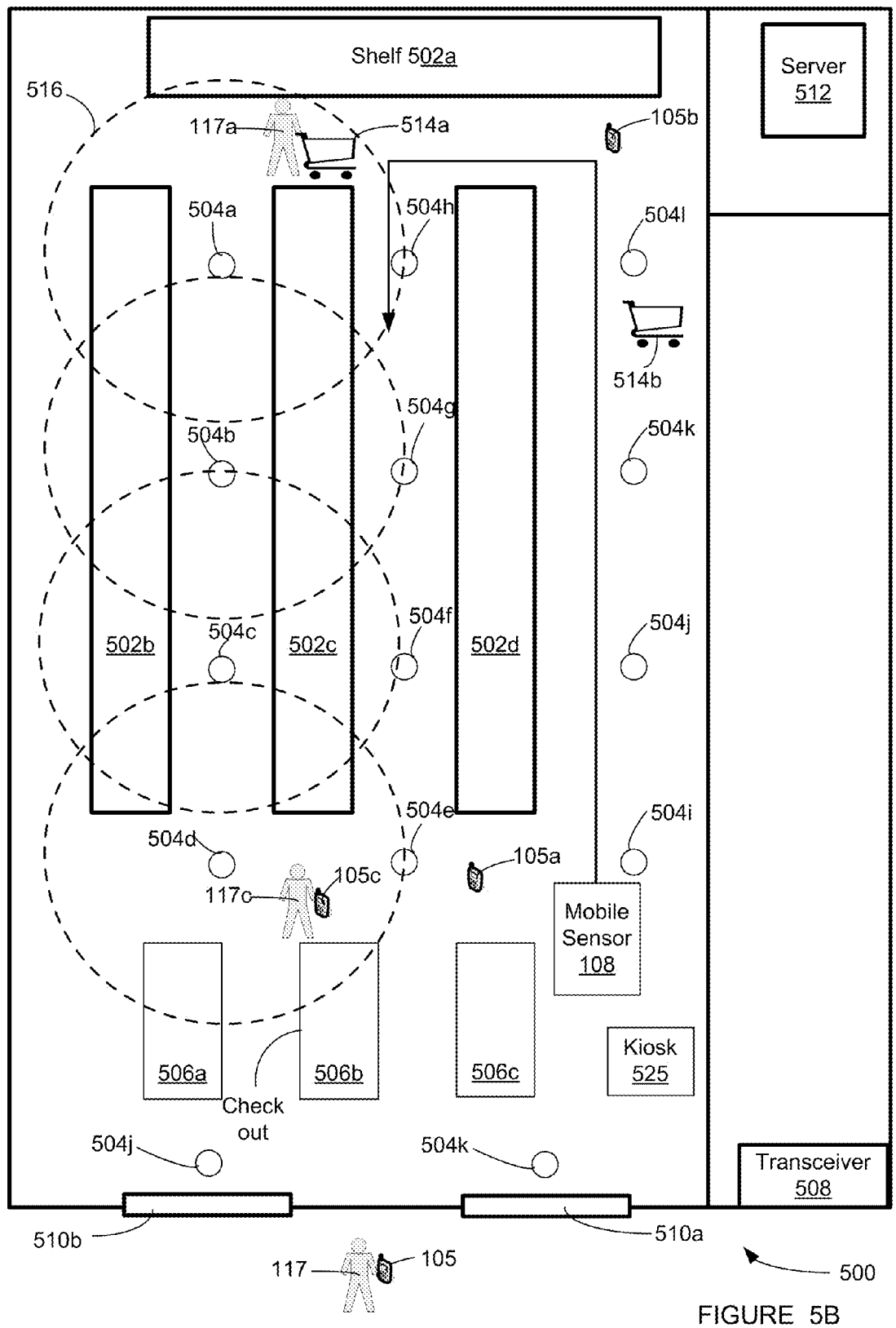
FIG. 5B is a block diagram of an internal sensor net associated with a retail establishment.

A block diagram of an internal sensor net associated with a retail establishment is discussed with respect to FIG. 5B. With respect to FIG. 6, a retail establishment including an internal sensor net is described. One example of an interface on a mobile device for viewing data from an internal sensor net set up in a retail establishment are described with respect to FIGS. 7A and 7B. In FIGS. 8A-8C, flow charts of methods in a server and a mobile device for viewing internal sensor net data and for providing internal sensor net data to one or more nodes, such as the mobile device, are discussed.

FIG. 5A is an illustration of an interface 550 on a mobile device 700 for viewing data from one or more status nodes associated with various service providers. The mobile device 700 can receive status data from one or more status nodes associated with a number of different service providers. In one embodiment, the mobile device 700 can receive the information directly from a status node or from one or more local nodes in communication with the status node. In other embodiments, the mobile device 700 can also receive information from a remote device that provides current status information over a data network.

As an example, one or more status nodes are associated with each of the service providers, such as 570, 572, 576 and 578. For instance, a single status node can be associated with each of the service providers, such as 570, 572, 576 and 578. In another embodiment, two or more different service providers can share a single status node such that the status node broadcasts status information associated with two or more different service providers. For instance, service providers 572 and 578 can share a status node.

The status nodes from different establishments can be configured as part of a local network comprising a number of different types of nodes. For instance, the nodes can be fixed nodes (located in a fixed position) or mobile nodes (where there position varies). The mobile nodes can also be temporary nodes, such as mobile phone, that is incorporated into a local sensor network when the mobile node is within a particular area, such as a mobile node carried by a person. In another example, some nodes can be configured to broadcast status information but may not be configured with sensors for detecting status information.

In other embodiments, some nodes can be configured with sensors that can be used to gather status information but may not be configured to broadcast the status information. For instance, these nodes can send their information to other nodes that broadcast the status information. In yet other embodiments, a node can both gather sensor information from its sensors and/or from other nodes as well as broadcast status information. In general, nodes that broadcast current status information can be referred to as status nodes.

As described above, such as with respect to FIG. 2, various nodes can be linked to together to extend a range in which status information can be locally broadcast. For instance, a first node (not shown) associated with service provider 576 can receive information, such as status information, from a second node (not shown) associated with service provider 572 and vice versa. The first and second node may broadcast status information locally, i.e., such that it can be at least received by a device in the vicinity of the first or the second node. The first and second nodes can broadcast information, such as current status information, about both the service providers, 572 and 576.

The nodes can be linked together as determined by the various service providers controlling each node. The service providers can agree to link their nodes in a mutually beneficial manner. For instance, certain groups of service providers can agree to broadcast information about one another, such as a group providing food services, a group providing restaurant services or all or a portion of the service providers in a particular area, such as within a mall. In particular embodiments, some service providers may not wish to link their nodes to any other service providers, to particular types of service providers or to competitors. Thus, in general, a node can be configured to only broadcast information about a specific establishment or one or more other different establishments. Further, a node can be linked to one or more other nodes controlled by different service providers.

Returning to FIG. 5A, the status nodes can be configured to provide current status information including image information that can be used in used in an interface program, such 550, executing on the mobile device 700. The interface can be output on the display of the mobile device where the display can be a touch screen display. In particular embodiments, current status information associated with different service providers can be displayed over image data or in conjunction with image data.

In one embodiment, the image data used in interface can be obtained from an image database, such as a Google™ street view image database, which is an example of a publically available image database. In another embodiment, a service provider or a group of service provider can maintain their own image database. Image databases maintained by a service provide may be proprietary database in that access to the image databases is not publically available. In yet another embodiment, image data used in the interface 550 can be obtained from a camera, such as a camera on the mobile device 700. Then, in conjunction with an application on the executing on the mobile device and a remote device, an image generate on the mobile device can be incorporated into interface 550 executing on the mobile device 700.

The application that selects image data for use in an interface, such as 550, can be configured to utilize multiple image databases, such as a proprietary image database maintained by one or more service providers and/or public image databases. The proprietary image database can be populated with user generated images as well as service provider generated images. The remote device can be configured to select image data from the public and proprietary databases that is most representative of current conditions, such as a time of day or a user location/orientation. The selected image data can then be augmented with additional data and then displayed on a mobile device, such as 700.

In FIG. 5A, the image data is augmented with current status data. Augmenting the image data can include determining a user view point and then selecting an image that is consistent with the user's view point. Data provided by a mobile device, such as orientation and location data, can be used by a remote device in communication with the mobile device to select an image for use with interface 550.

For the purposes of determining its location and orientation, the mobile device can include various sensors. For instance, the mobile device can includes one or more sensors that allow a position of the mobile device to be determined in relation to a GPS system, in relation to one or more local nodes or in relation to one or more cell phone towers. The determination of the position can be performed by the mobile device alone or in conjunction with a remote device. Further, the mobile device can include accelerometers and other sensors that allow the orientation of the device to be determined. The location and orientation data can be used to select an image which can then be augmented with current status information from one or more service providers as is shown in FIG. 5A.

In another embodiment, when an image is generated from a mobile device, one or objects in the image can be identified and then a coordinate system can be mapped to the image. When an object of a known physical size and known physical location is identified in the image data or when two or more points in the image data with known physical locations are identified, a mapping between physical locations and pixel locations on the image data can be determined. The pixel dimensions of an object of a known physical size can be used to determine a scaling factor between pixel coordinates and physical coordinates. Then, the location in the image of the identified object and the scaling factor between pixel coordinates and physical coordinates can be used to proximate the locations of other objects with known physical locations in the image.

For example, if the door 582 to server provider 570 is identified in the image, then the known physical position of the door 582 and its physical dimensions can be used to determine a scaling factor in the image. The scaling factor can be used to proximate the location of other objects in the image without necessarily identifying the object in the image. For instance, the pixel scaling factor and a known physical distance and orientation of service provider 576 relative to door 582 identified in the image can be used to proximate a location of the service provider 576 in the image data.

In one embodiment, if no objects can be identified in image data received from a user's mobile device. For instance, an image may be generated of a user's hand or the ground and, thus, the image data may not contain identifiable objects. In this scenario, an application that processes the image data can request additional image data to be generated. Alternatively, based upon location/orientation data associated with the mobile device, the application can select an image from an image database to be used with the interface 550 as described above.

The mapping of the physical coordinate system to a coordinate system associated with the image data can allow augmented data to be drawn at a particular locations in the image that corresponds to the locations of objects in the image. For instance, service provider locations known in a physical coordinate system can be mapped to the pixel locations or a pixel area associated with image data to allow information about the store, such as current status information, to be rendered in the image proximate to the store location in the image. The augmented data can be rendered over the top of the image data in interface 550.

In one embodiment, a remote device can store images obtained from mobile devices in an image database. The image database can be a proprietary image database or a public image database. The image database can include information about the time of day the image was taken, the day of the year and/or current weather conditions, such as sunny, cloudy or raining as well as a location from where the image was taken. The images stored in the image database can be selected and reused to provide an augmented image to other mobile devices, such as an augmented image provided in interface 550.

In some instances, image data obtained from various user devices may be more current or more representative of current conditions, than image data from other image sources, such as a public image database provided by a service, such as a street view in Google™ maps. For instance, a public image database can only include images taken from a limited number of locations and orientations over a short time period. An advantaged of image database enhanced with user generated images can is that it can include images generated from much more different orientations and over many different conditions, such as images generated from user's of different heights at many different locations or under different weather and lighting conditions occurring over many different days.

A number of examples augmented data are shown in the interface 550. These examples including the format that the information is provided are for the purposes of illustration only. For instance, call outs 570*a*, 572*a*, 576*a* and 578*a* are shown. The call-outs are drawn over underlying image data and point to a particular location in the image. Each call-out indicates a type of service provider. For instance, call out 576*a* indicates the location is a retail store, callout 578*a* indicates phone services are provided at the location, callout 570*a* indicates groceries are provided at the location and callout 572*a* indicates baked goods are provided at the location. The call-outs include current status information about each service provider. For instance, call-outs 576*a*, 578*a*, 570*a*, indicate that each of the service providers is currently open. While call-out 572*a* indicates the service provider is currently closed but will reopen in ½ hour.

The interface 550 can be implemented on a touch screen display. Via touches different information can be obtained. For instance, a remote device can be configured to associated touch locations with particular service provide locations in the image. When a particular location in the image is touched, such as a touch proximate to a service provider location in the image, additional information about the service provider can be output to the interface. If a device includes other input detectors, such as buttons, accelerometers or magnetic sensors, these detectors can also be used to input data into the interface 550 or navigate within the interface. For instance, for a mobile device with accelerometers, tilting or shaking the device can be used for navigation purposes.

In one embodiment, an indicator, such as an arrow 574, can be displayed proximate to a location in the image of a particular service provider. The indicator can be used to indicate that additional and more detailed status information is being displayed about the service provider proximate to the indicator. For instance, the arrow 574 can indicate an "active" store for which additional status information is being provided. In particular embodiments, in response to a detection of an input at a particular location on the touch screen or via another input device, the arrow can be moved to an underlying location in the image. For example, the arrow 574 can be moved when a user touches another location on the touch screen. In another example, the interface 550 can be configured to allow the arrow to be dragged to a different location in the image via a detection of a series of touches on the mobile device.

Touch screen locations can be mapped to pixel locations associated with the display and image data displayed on the display. Thus, different touch screen locations can be associated with different service providers. For instance, detected touches in a first area of the touch screen can be mapped to service provider 576, detected touches in a second area can be mapped to service provider 578, detected touches in third area can be mapped to service provider 570 and detected touches in a fourth area can be mapped to servicer provider 572. Not all areas of touch screen may be mapped to a service provider. For example, the portion of the touch screen associated with the sky 580 may not be associated with a service provider. Further, portions of the building may not be associated with a service provider. Thus, when a touch is detected in these locations, current status information may not be displayed and the interface 550 may be display a message indicating that a selection of an active store has not been detected.

When the arrow is moved to different locations, the active store is changed and current status data associated with the active store is displayed. For instance, in FIG. 5A, the arrow 574 is over the grocery store 570. Thus, the grocery store 570 is the active store. In part of the interface 550, additional information can be provided about the store including additional status information. The additional information can include but is not limited to a more detailed description of the store 556, such as the store provides general groceries and includes a meat department.

Current status information 558 can be provided, such as but not limited a waiting period at the checkout, a number of customers in the store, a number of employees working the floor, a number of checkout lanes that are open. In one embodiment, a video feed from one or more locations inside the store, such as near the checkout line can be provided and displayed in interface 550. In another embodiment, a recent image generated from a video device within the store can be generated. For instance, a frame from a video feed generated within some time period can be generated. The time period can determine how often the frame is updated, such as every 5 minutes or 10 minutes.

The current status information 558 may be used by a user to affect their trip planning. For instance, a person may wish to enter or not enter a store based upon a waiting period at the checkout or a number of customers in the store. Parking information, such as 564, can also be provided in the interface 550. The parking information as previously described can also affect their trip planning. If there is no wait in the store and parking is available nearby, a person may decide to make an unplanned trip to the store. While if there no parking or the wait was long, a person may decide to come back later. Besides parking, transportation information (not shown), as previously described, can also be provided in interface 550. For example, if a person is interested in catching a bus and they have information indicating that a bus will not arrive for another ½ hour, then in the interim, a user can decide to enter a store while they are waiting.

In one embodiment, the interface 550 can output current people status information 560, such as particular people working in the store. This information can be useful if a user wishes to interact with a particular employee. In other embodiments, current status information about a particular customer in a store can be revealed. For example, a mobile device can be configured to allow its location and associated user to be revealed to select other users. This information could affect a trip planning. For instance, a person may wish to enter or not enter a store based upon the presence of particular employees or customers in a store.

Additional current status information (not shown) can include whether specific departments in the store are open or whether anyone is currently working in the specific departments to provide help or a service associated with the department. As examples, the specific departments could include a bakery or meat departments in a grocery store or a clothing or a wedding departments in a retail merchandise store. For instance, a person may wish to travel to the grocery store 570 to order a cake from the bakery department. Providing the current status information associated with the bakery department, such as that no one is currently in the department or that the department is closed but that the department will open later may allow a user of interface 550 to better plan a trip. For instance, the user can use the information to not seek parking and come back later.

In another embodiment, current status information can include indications of current specials or deals, such as 562. The current special or deals can be used to incentivize a person to enter a service provider at a particular time or within a particular time period. For instance, special 562, indicates that soda is on sale for the next hour. Service providers may use such specials in responses to a number of customers in the store as well as an availability of a particular item in the store. For instance, when a store is not busy or there is a large amount of a particular item available a special can be offered.

In other embodiments, for services that require appointments, current status information relating to appointment availability can be provided. For instance, a hair salon can indicate that a walk-in appointment is currently available via a status node. This information can be displayed on interface 550. The current status information can also include what person is available to perform the haircut. The current status information that is displayed in interface 550 for a particular service provider can also indicate when the service provider will be ready for a particular appointment. For instance, the service provider can be a doctor, a dentist or a motor vehicle office and the current status information can indicate when a particular appointment slot is ready to be given service.

In yet other embodiments, current status information can be provided without using representative image data. For instance, the current status information can be displayed on a map an area surrounding the area where the interface 550 is being utilized. In another example, the interface 550 can be configured to allow a user to request current status information for a particular service provider, such as a service provider in a user's line of sight. The requested status information can be output in a textual format to the interface 550.

In a particular embodiment, the interface 550 can accept commands and instructions and output information in an audio format. For instance, a user in an automobile can provide a verbal instruction, such as "provide status for store A," the interface 550 and its associated device can receive this information and then output the information in a verbal format. For instance, in response, the interface 550 can indicate "store A is open and is not currently busy." Next, details of an internal sensor net associated with a service provider are described.

FIG. 5B is a block diagram of an internal sensor net associated with a retail establishment 500. The retail establishment 400 includes a number of structures for displaying merchandise, such as shelves 502a, 502b, 502c and 502d. Other structures, such as racks for displaying clothes or other types of merchandise can be included depending on the type of store. The retail establishment includes two customer entrances 510a and 510b and a checkout area with three check-out counters, 506a, 506b and 506c near the entrances.

The layout and merchandise display structures are provided for the purposes of illustration only. Different service providers can provide establishments with different merchandise display structures and layouts that vary from establishment to establishment. Further, not all services providers sell merchandise. For instance, a government service provider, a dentist, a doctor or restaurant may operate an establishment that does not include structures for displaying merchandise.

A number of sensor nodes can be distributed throughout the retail establishment. The fixed sensors, such as 504a-504k, can include but are not limited to cameras, RFID sensors, wireless device detectors, proximity sensors, pressure sensors, light sensors, motion sensors or combinations thereof. The sensors can be in communication with each other and other devices, such as server 512. The server includes one or more processors and memory for executing various applications and communications interfaces for communicating with the sensors and other devices, such as transceiver 508.

When cameras are employed as a sensor, the cameras can be configured to provide a live video feed or still images. The still images can be stored to an image database that is regularly updated. For instance, an image database can be maintained on server 512. The live video feed or still images can be used to provide current status information to a user, as was described with respect to FIG. 5A and is described in further detail with respect to FIGS. 6, 7A and 7B.

The server 512 can be configured to select a video feed or still images from a video feed to a remote device, such as a mobile device. A mobile device, such as 105, 105a, 105b or 105c can request information about a particular area of the retail establishment. The server 512 can store information mapping particular areas of the retail establishment to particular cameras. Based upon the information received in the request from a mobile device, the server 512 can determine which camera is associated with the request.

As an example, a mobile device can send information asking for a current shelf status of a particular item. A number of cameras can be deployed where at least one camera is trained on the shelf containing the product of interest. After receiving the request, the server 512 can determine whether any image data is available in regards to the shelf status of interest. For instance, the server can determine which camera is trained on the shelf area and provide a live video feed or a grab an image from the video feed and send it to the user. In another example, the server 512 can maintain and image database that is regularly updated. The server 512 can locate in the image database its most recent image including the area of interest, such as an image of the product on shelf, and send this image to the mobile device with some indication of when the image was generated (e.g., 5 minutes ago, 1 hour ago, etc.)

The image data obtained from the cameras can be combined with object recognition software. The object recognition software can be executed on a device, such as server 512. In particular embodiment, the object recognition software can be used to identify the presence of people, such as people in a particular area in an image. The object recognition software may also be able to identify particular products, such as products placed on a shelf in an image. Further, the object recognition software can also be used to recognize a "space," such as a vacant area on a shelf or in a display area in an image. Space information obtained from an image can be useful for restocking purposes. In addition, if a special were run for a particular product as described with respect to FIG. 5A, a detection of an absence of the product, such as resulting from a successful special, can be used as a trigger to end the special and perhaps instantiate a new special.

In particular embodiments, the cameras used herein in any of the applications can be 3-D depth sensing cameras. In one embodiment of 3-D depth sensing camera, the camera has sensors that are able to measure the depth for each of the captured pixels using a principle called "Time-Of-Flight." Using "time-of-flight," 3D information is obtained by emitting pulses of infra-red light to all objects in the scene and sensing the reflected light from the surface of each object. The objects in the scene are then ordered in layers in the Z axis. Thus, z-axis data is associated with pixel data obtained from the camera. One manufacturer of cameras that can be used with the devices herein is Primesense™ (Tel Aviv, Israel)

In particular embodiments, a 3-D depth sensing camera can be used with the mobile devices, sensors and kiosks described herein. For instance, a 3-D depth sensing camera can be integrated in a mobile device, such as 105, 105a, 105b, or 105c, a sensor node, such as 108, 300 (see FIG. 3) or 504a-j, or a kiosk, such as 525. In alternate embodiments, the 3-D depth sensing cameras can be used as an interface for recognizing gestures of a user.

The 3-D depth cameras can be used to provide image and depth information. The image and depth information can be used to better determine a position and orientation of the user in the store and their relationship to products in the store. For instance, if one or more objects with a known physical location can be identified in an image, then distance data provided with an image generated using a 3-D depth sensing camera can be used to more accurately pinpoint the location of the user and their orientation.

In other embodiments, the mobile devices, sensor nodes, kiosks and devices described can include multiple cameras. For instance, a mobile device or the mobile sensor can include two cameras orientated in the same direction that allow 3-D images to be generated. In another example, a mobile device can include two cameras orientated in different directions, such as a first camera used for the purposes of taking images and a second camera orientated in a different direction for 3-D depth sensing.

In one embodiment, a number of wireless device detectors are positioned throughout the establishment. The wireless device detectors can be coupled to a sensor node as previously described with respect to FIG. 3. The wireless device detectors can be configured to detect a signal emitted from a mobile device, such as cell phones 105a, 105b and 105c, if equipped, a shopping cart, such as 514a and 514b or other wirelessly equipped devices. In some embodiments, information detected by the wireless device detectors can be used to determine a location of a wireless device, such as a mobile device.

As an example of wireless device detection, cell phones regularly send out signals that allow the devices to be identified and communicate with cell phone towers. These signals can be picked up to one or more wireless device detectors to allow a position of the cell phone to be tracked to within a ⅓ to ⅔ of a meter. In some embodiments, the wireless detectors can be used to detect the presence of particular users via the data emitted from their cell phones. Path Intelligence Ltd (Hampshire England) provides units that allow cell phones to be tracked to within a meter or two while a person is indoors and to possibly identify users.

Methods such as triangulation can be used to determine a position of a device as it moves throughout an establishment. This approach can be advantageous in an indoor environment where signals, such as GPS signals or signals to and from cell phone towers, are blocked. When GPS signals and/or signals to and from cell phone towers are available, this information can also be used to help to determine the location of a wireless device within an establishment.

As describe above, a shopping cart as well as other in-store devices can also be configured with a device that emits a wireless signal. The wireless signals can be tracked via a wireless signal detector, such that a path can be determined for a mobile device emitting wireless signals. In one embodiment, the path that a cell phone or a shopping cart travels throughout a retail establishment can be determined and stored on a device, such as server 512.

In another embodiment, object recognition software in combination with image data obtained from one or more cameras can be used to track the path of a mobile object through a store. For instance, a path of a person or a shopping cart can be determined using object recognition software. In some instance, a shopping cart or hand carried shopping basket can include markings that allow it to be more easily identified by object recognition software. In some embodiments, path data can be generated from a number of sources, such as via both image data and wireless signal data.

The path data can be used for developing better flow patterns for people within a retail establishment. For instance, areas in the establishment where objects, such as people or carts, tend to pile up can be identified. In one embodiment, congestion area can automatically be identified by software executing on a device, such as server 512. In response to detecting a congestion area with lots of delays, a remediation action can be carried out. For instance, shelving distances can be rearranged or product placement can be changed to relieve traffic. After product placements or merchandise display structures are modified, the affects of changes can be validated using path data gathered after the remediation action.

In other embodiments, a proximity sensor can be used to detect the present of an object. For instance, a pressure sensor can be used to detect the presence of an object on a shelf. In another example, a pressure sensor can also be used to detect whether a person was standing in a particular area, such as behind a service counter or at a checkout station. In another example, an RFID reader with a limited range can be used to detect the presence of a nearby RFID tag, such as an RFID tag placed on a particular product. The RFID reader can be built into a shelf and used to detect whether a particular item is in stock. As another example, a mobile sensor, such as 508, can include an RFID reader that allows data to be periodically gathered from RFID tags.

In another embodiment, a light sensor can be used to determine whether a shelf is occupied or not. When the light sensor is covered by an object, the light entering the sensor changes, which can be used to indicate that the shelf is occupied at the location of the light sensor. A motion sensor can be used to detect a movement of objects, in a particular area. For instance, a motion sensor can be used to determine whether someone is in a particular area, such as behind a service counter. Further, motion detectors can be used to count objects, such as persons entering the retail establishment.

The sensor nodes can be located at fixed locations, such as on a ceiling, a floor or on a shelf. In addition, some sensor nodes can be mobile. For instance, sensor node, such as a camera can be attached to a mobile device, such as a shopping cart. For instance, shopping carts, such as 514a and 514b, can include a sensor node with a sensor that allows a position of the shopping cart to be tracked, a sensor, such as a camera, that allows image data from within the store to be gathered or an RFID reader that allows data to be gathered from RFID tags distributed through out the store.

In one embodiment, a mobile sensor unit 508 can be equipped with a number of cameras that allow image data of a stores display structures to be captured from an eye level view. Further, the mobile sensor unit 508 can be equipped with a number of cameras positioned at different heights from the floor to capture eye level data that can be better matched to people of different heights. For instance, the mobile sensor can have a first camera positioned at 5 feet and a second camera positioned 6 feet to capture eye level image data that may be more appropriate for short people or tall people. In another example, the mobile sensor unit 508 can have cameras positioned between 4 and 7 feet.

The mobile sensor 508 can be directed through the retail establishment 500 at least once a day to capture eye level image data associated with merchandise placed on various display structures, such as shelves 502a, 502, 502c and 502d. The image data can be stored to an image database where images from image database can be selected to provide a mobile interface that is described in more detail with respect to FIGS. 7A and 7B. In one embodiment, the mobile sensor 508 can be a wheeled device that is directed or driven through the retail establishment by a user. In another embodiment, the mobile sensor 508 can be mounted onto a unit that is configured to direct and propel itself on a path through the retail establishment at least once a day.

In one embodiment, RFID tags can be used to develop and maintain a mapping of products to display structures in the store. For instance, RFID tags can be embedded in the shelves and in products. The location of the RFID tags in shelves can be determined when the RFID tags are placed. Then, a RFID reader, such as mobile sensor unit 508, can be moved through an area that detects the RFID tags in the shelves and RFID tags in products. The information read from the shelf tags and the products can be used to develop a mapping a products to particular store areas.

Another method of mapping products to particular locations can involve using bar-codes or a similar technology. Display structure locations can be marked with bar-codes where each bar-code is mapped to a particular location. When at least one of a group of products is placed on a display structure, its bar-code can be scanned and a bar-code associated with the nearby location on a display structure can be scanned. Thus, particular store locations can be mapped to particular products to develop and maintain a mapping of products and their locations within an establishment.

Yet anther method of mapping products to particular locations can involve using cameras and object recognition software. Objects, such as products, can be identified in image data. Display structures can include unit markings that correspond to their location, which can also be recognized in image data to develop and maintain a mapping of product locations within a retail establishment. In various embodiments, combinations of the described methods, such as using RFID tags, bar-codes and object recognition technology can be utilized.

Returning to FIG. 5A, the range of a sensor can vary from sensor to sensor. For instance, the fixed sensors can have a particular useful range, such as range 516, indicated by the dashed circle. The range of the sensors can vary from sensor to sensor. Some sensors, such as wireless detectors can have a range that extends throughout the retail establishment. Other sensors, such as a pressure sensor, that detects the presence of an object on a shelf can have a range that is limited to a particular area on the shelf. A camera can have a range that is limited by objects in its line of sight. For instance, a camera on a shelf in an aisle may be able to view objects across the aisle. While a camera mounted to a ceiling may be able to view objects across multiple aisles and detect objects, such as people in an aisles.

The various sensors can be coupled to a device, such as server, 512. As previously described, the server can be used to store and process sensor data. For instance, the server 512 can be used to store and process image data received from a camera. Further details of processing image data are described with respect to FIGS. 6, 7A and 7B. Based on the information processed from the various sensors, a device, such as the server 512, can also be used to generate current status information. The current status information can be displayed on interfaces executing on mobile devices, such as mobile devices, 105a, 105b and 105c inside the establishment 500 or mobile devices outside of the establishment, such as 105. In addition, interface can be provided on devices controlled by an establishment, such as shopping carts, 514a and 514b.

The server 512 can be configured to send current status information to a current status node, such as 508. The current status node, as previously described, can broadcast current status information in an immediate area outside of the establishment. Current status information can also be broadcast within an establishment. The broadcast area of current status information can be increased by linking the current status node, such as 508, with other nearby status nodes, such as status nodes associated with other service providers.

To provide current status information, the server 512 can be configured to 1) send "raw" or unprocessed sensor data to a status node, 2) process the sensor data and then send information representative of the sensor information or 3) combinations thereof. For example, as a measure of a current business of the store, the server 512 can be configured to provide direct access to image data from one or more live video feeds within the establishment. In particular embodiments, a device, such as the server 512, can be configured to provide access to particular video feeds, such as a video feeds associated with a particular area, in response to a request for a received from a remote device. Based upon the received image data, a user can assess a current status of the establishment. For instance, a number of people can appear in image data of a check-out area. Based upon, the number of people appearing in the image data, a user can decide whether the service provider is busy or not and whether to enter the establishment or not.

In other embodiments, the server 512 can be configured to pre-process sensor data and make a determination of what information to release as current status information. For example, the server can be configured to determine a number of people in a checkout area and based upon the determination characterize the establishment in some manner. For instance, based upon a determination a number of people, the server 512 can provide current status information in a some format, such as in a text or audio format, as a messages, such as "very busy," "moderately busy," or "not busy."

The determination of a characterization that is supplied as current status information can account for many different factors besides a current number of people in the checkout area. For example, the server 512 can be configured to account for factors such as a number of people in the checkout area, a number of people in the store, how long people tend to shop, how long particular people have been shopping and how fast people on average are being processed. Based upon these factors, the server 512 can be configured, to predict how busy it will be for person that receives the message, enters the store shortly thereafter, does some shopping and then proceeds to the checkout. The server can provide the prediction of a service time for person currently entering the store as "current status information."

As an example, a checkout area in a store can be currently busy. However, most of the people in the store can be at the checkout and few people may remain in other parts of the store. Thus, indicating that the current status of the store is busy based upon the checkout data only can be incomplete for a person just entering or about to enter the store because by the time the person entered the store and did their shopping, the wait time at the checkout area may be quite small. Conversely, if the number of people at the checkout line was currently small, but there were a large number of people in the store, then by the time a person entered the store and did their shopping, the checkout area can become quite busy. Thus, current status information indicating that the store was not busy, such as an image of the checkout area, might not be adequate for a person just entering the store.

Thus, in general, the server 512, can be configured to provide "current status information," that is predictive of an experience that a person is likely to have if the person enters the store within some period after the current status information is displayed. The prediction can be based upon data gathered from an internal sensor net comprising a number of sensor nodes, such as sensor nodes, 504a-504k. In addition, the prediction can be based upon current store staffing, past employee behavior (e.g., how fast they process people at a check-out or how long it takes to provide a person a particular service, such as a particular service at a motor vehicle office or a doctor's office), past consumer behavior (e.g., how long they spend in the store before proceeding to checkout), a current number of users in the establishment, a length of time users particular users have been in the establishment, a type of service a person is seeking and combinations thereof.

In the case of appointments, a number of services may be scheduled for particular individuals. Thus, for appointments, the type of service a person is seeking may be known. The server 512 can be configured to receive information related to whether a scheduled service has started or not, such as whether a hair-cut has begun or whether a person has started a dental appointment. Also, the server 512 can receive information related to whether a scheduled service is completed or not. With this type of information, the server 512 can be configured to receive a request for the availability of a particular service and make a prediction related to an experience of a person seeking the service is likely to receive. Information describing an experience a person is likely to receive can be referred to as a current service status.

The server 512 can determine a status of a desired service, such as whether it has begun or completed, based upon data received from a local sensor net as well as data input by a service provider. For instance, in a dental clinic or doctor's office, input devices can be provided that allow a service provider to indicate whether a person has started or completed a service. As another example, a camera in an office can provide image data of a service area, such as a dental chair, or the dental chair can include a sensor that is used to determine whether it is occupied or not. Based upon the sensor data, the server 512 can be configured to determine when a service has begun or has ended. For instance, based upon the image data or sensor data from a chair, the server 512 can determine when a dental chair is occupied and how long it has been occupied and based upon this information determine whether a service has begun or has been completed.

In one embodiment, certain types of information may only be available to local users. For instance, current special information (see FIG. 5A) may only be communicated to users that are within the establishment or near the establishment. Non-local users may not be able to access this information. As another example, image data, such as image data derived from a video feed may only be provided to local users.

The server 512 can be configured to determine whether a device is local or not based upon the communication mode that a device, such as a mobile device is employing. For instance, the server 512 can be configured to determine whether a mobile device is communicating via a local communication node, such a communication node in the establishment associated with a service provider, or a remote node, such as via an Internet connection. When a device is communicating via a local node, the server can designate it as a local device. As previously described, the server 512 can be configured to detect that a mobile device is in the establishment, such as via one or more sensors providing wireless device detection. When the server 512 detects a mobile device is in the establishment, the device can be designated a local device. In yet another example, the server 512 can receive positioning data from the device, such as its location as determined from GPS measurements and/or cell tower communications Based upon the received positioning data, the server 512 can determine whether the device is local or not.

The current status information may be limited to local users only because it may not be applicable to non-local users. For example, a prediction of an experience obtaining a service, such as an amount of time to get through a grocery store, may be applicable to person that is nearby and can in short time seek out the service, such as within 5 minutes, but may not be applicable to person that is farther away from the establishment, such as ½ hour away. Further, a likelihood of a person seeking out a service may be greater if a person is nearby an establishment or within the establishment as opposed to farther away from the establishment. Thus, it may be desirable to broadcast certain types of current status information only locally to target individuals that are more likely to take advantage of the service because they are nearby or already within the establishment. Therefore, the server 512 can be configured to release certain types of status information only for local broadcast, such as via transceiver 508.

In other embodiments, the server 512 can be configured to provide "current status information" based upon a location of a mobile device such as depending upon a distance of the mobile device from the establishment including a zero distance (i.e., within the establishment). Thus, different types of current status information can be sent to directly different devices (as opposed to broadcasting the information to all devices) depending on how far away the devices are from the establishment. Further details of current status information that can be provided including an example interface are described with respect to FIGS. 6, 7A and 7B.

In a particular embodiment, the kiosk 525 can be included in the retail establishment. The kiosk 525 can be configured to perform some or all of the functions of the server 512. In addition, the kiosk can provide transportation services as previously described, such as parking services. For instance, a person may be able to obtain additional parking at a kiosk located in the retail establishment without returning to their car. In addition, the kiosk can be equipped with sensors, such as wireless device detectors or other sensors that allow status information to be gathered. Further, kiosk 525 can be configured to provide augmented image data, such as displaying and/or providing a printout of an augmented image as is described in more detail with respect to the following figures.

Figure 6:
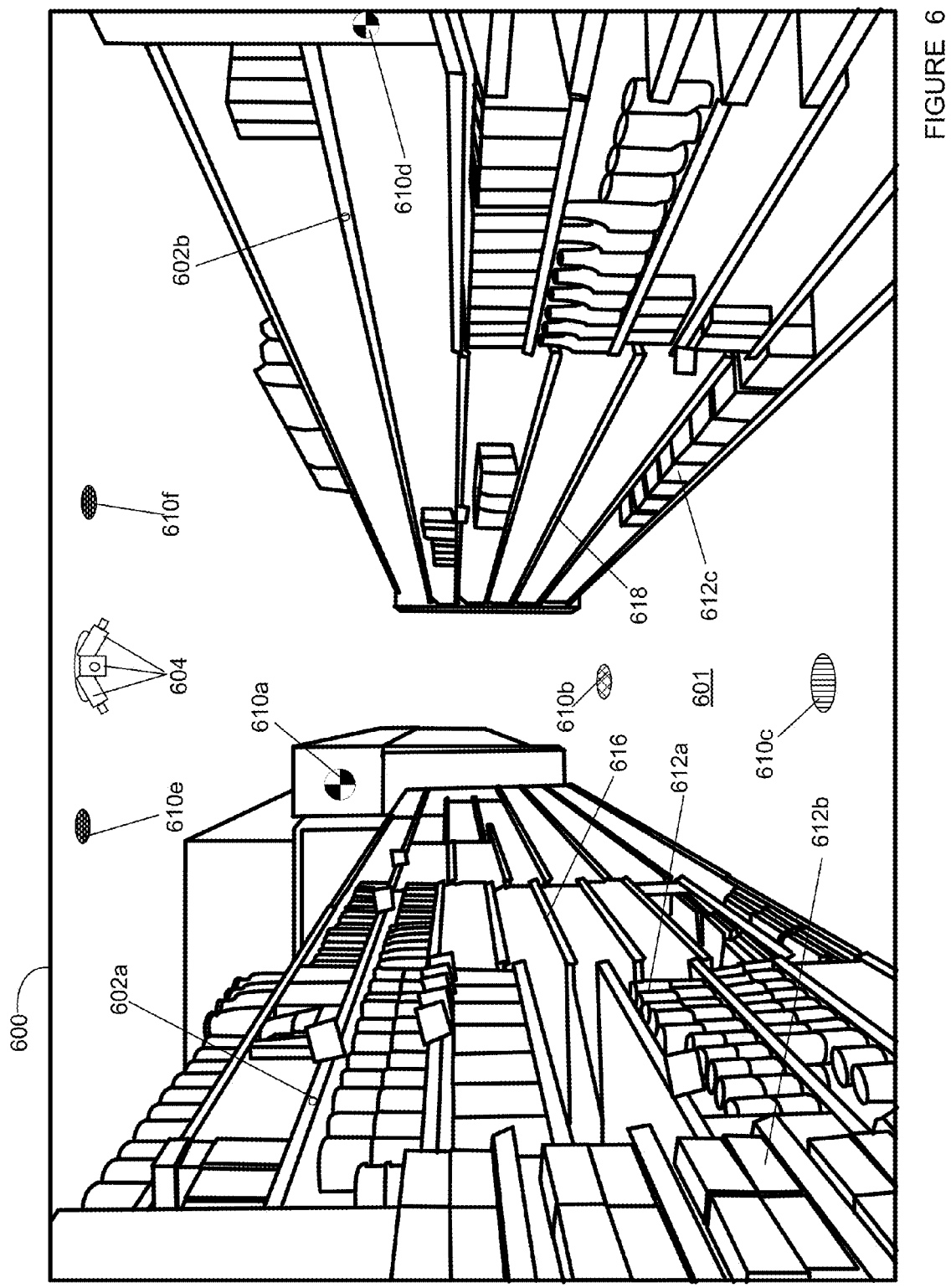
FIG. 6 is an illustration of an interior of a retail establishment including an internal sensor net.

FIG. 6 is an illustration of an interior of a retail establishment including an internal sensor net. As an illustrative example, "eye level" image data 600 of the interior of a grocery store is provided. The image data 600 is from a view of looking down in aisle 601. In various embodiments, the image data 600 is generated from a mobile device, such as a cell phone camera carried by a user, a fixed camera located within the establishment or a mobile camera, such as mobile sensor 508 described with respect to FIG. 5A.

The aisle 601 includes a number of shelves, such as 616 and 618. Products, such as 612a, 612b and 612c are placed on the shelves. In various embodiments, sensors that are part of an internal sensor net are located on the shelves. For instance, cameras 602a and 602b are shown located on the shelves. The cameras 602a and 602b can provide "eye level" image data associated with a "shelf." The image data can be used to determine a shelf status, such as a current "appearance" of the shelf. A number of these cameras can be placed on different shelves at different heights along the aisle to provide image data used to determine a current shelf status.

The cameras can be placed such that their fields of view overlap. Overlapping image data can be used to provide a navigable interface where the shelves can be viewed from different orientations, such as from a user standing in a particular location and viewing the shelves along a particular line of sight. Details of such an interface are described in more detail with respect to FIGS. 7A and 7B.

A number of cameras, 604, are shown mounted to a ceiling. These cameras can provide image data that can be used to identify objects, such as people or baskets in a various aisles, such as aisle 601. Further, the cameras may be able to detect whether portions of the shelves are occupied or not depending on the mounting location of the camera and what portions of the shelves are visible in image data obtained from the camera.

A remote device, such as server 512, described with respect to FIG. 5B, can be configured to process the image data to determine the shelf status. For instance, the server 512 can be configured to detect a presence or an absence of a particular product, and possibly quantify how many of particular products are on the shelf. The server 512 can be configured to assess the appearance of the shelf, such as whether it is messy or disorganized. In response to a shelf status, the server 512 can be configured to provide recommendations, such as a shelf in a particular area needs to be restocked or reorganized.

As described above, the 512 server can also be configured with object recognition software that allows particular products to be recognized. For instance, text on a label, a shape of a product or patterns, such as color patterns on a container can be used to recognize particular objects. Or as previously described, other types of sensors can be used to gather shelf data, such as pressure or light sensors. Also, wireless detectors, such as RFID readers can be used to read information from nearby RFID equipped products or RFID equipped. This sensor information can be used in a determination of a current shelf status, which can include information regarding locations of various products throughout the store.

The image data may capture identifiable landmarks. Landmarks can be signage, such as a permanent sign with text. Further, unique symbols, such as 610a, 610b, 610c, 610d, 610e and 610f that are identifiable in image data can be placed throughout the establishment. The symbols can be placed or mounted to a ceiling (e.g., 610e and 610f), a wall (e.g., 610a), a shelf (e.g., 610d) or a floor (e.g., 610b and 610c). Using the symbols may make it easier to identify objects in the image using image recognition software.

A database on a remote device, such as server 512, can store locations and/or sizes of particular symbols. When a particular object is recognized in image data, the location and size of the object from the database can be used to determine a location and orientation from which the image was taken. As was described with respect to FIG. 5A, it can also be used to determine locations of other objects in the image data. This type of analysis can be used to map objects to image data generated from a mobile device, such as a camera on a mobile device, based upon known locations of various objects in a physical space and a determined relation between a coordinate system associated with the image (e.g., pixel coordinates) and a physical coordinate system.

Figure 7A:
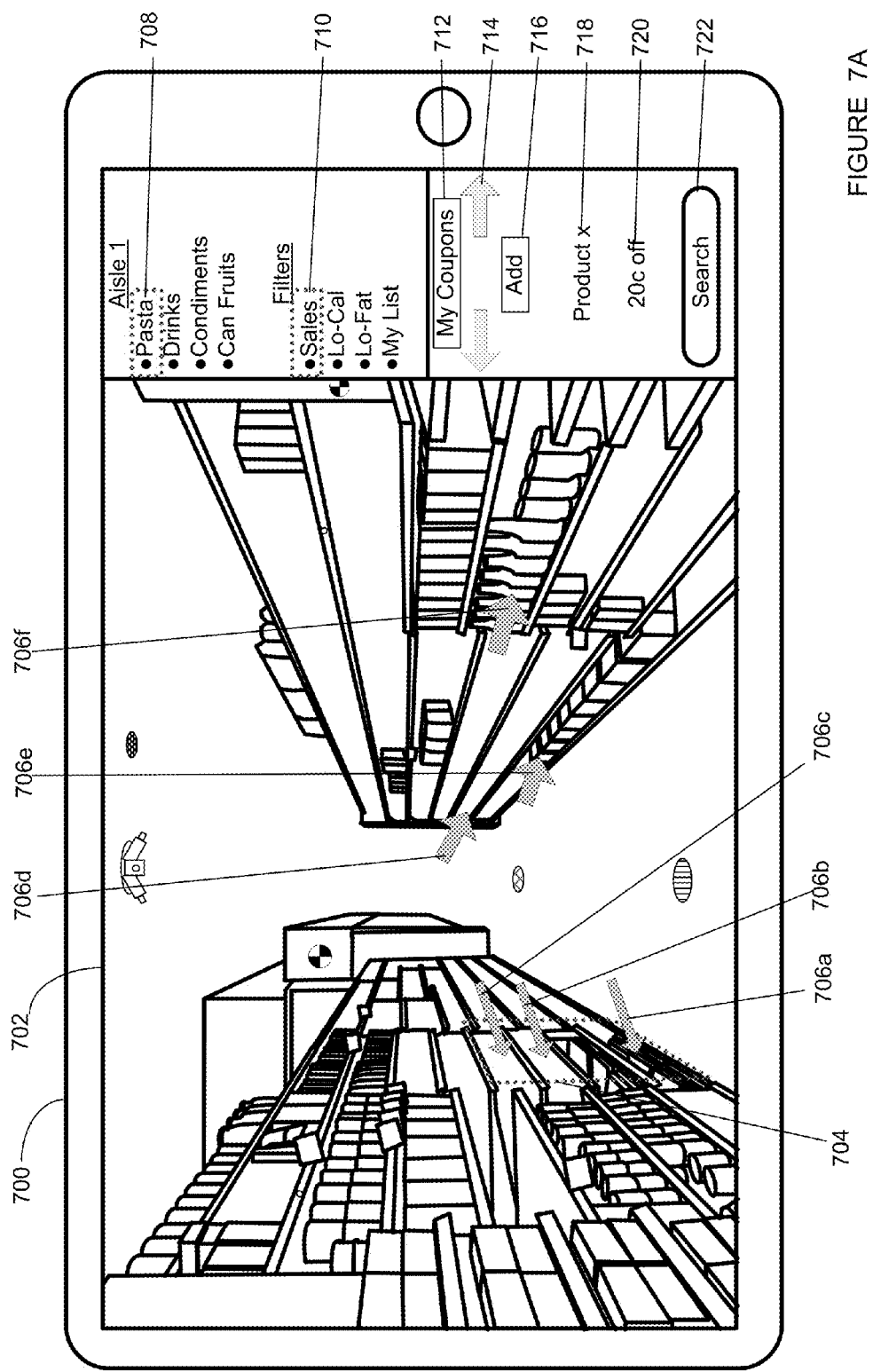
FIGS. 7A and 7B are illustrations of an interface on a mobile device viewing data associated with an internal sensor net in an establishment.
Figure 7B:
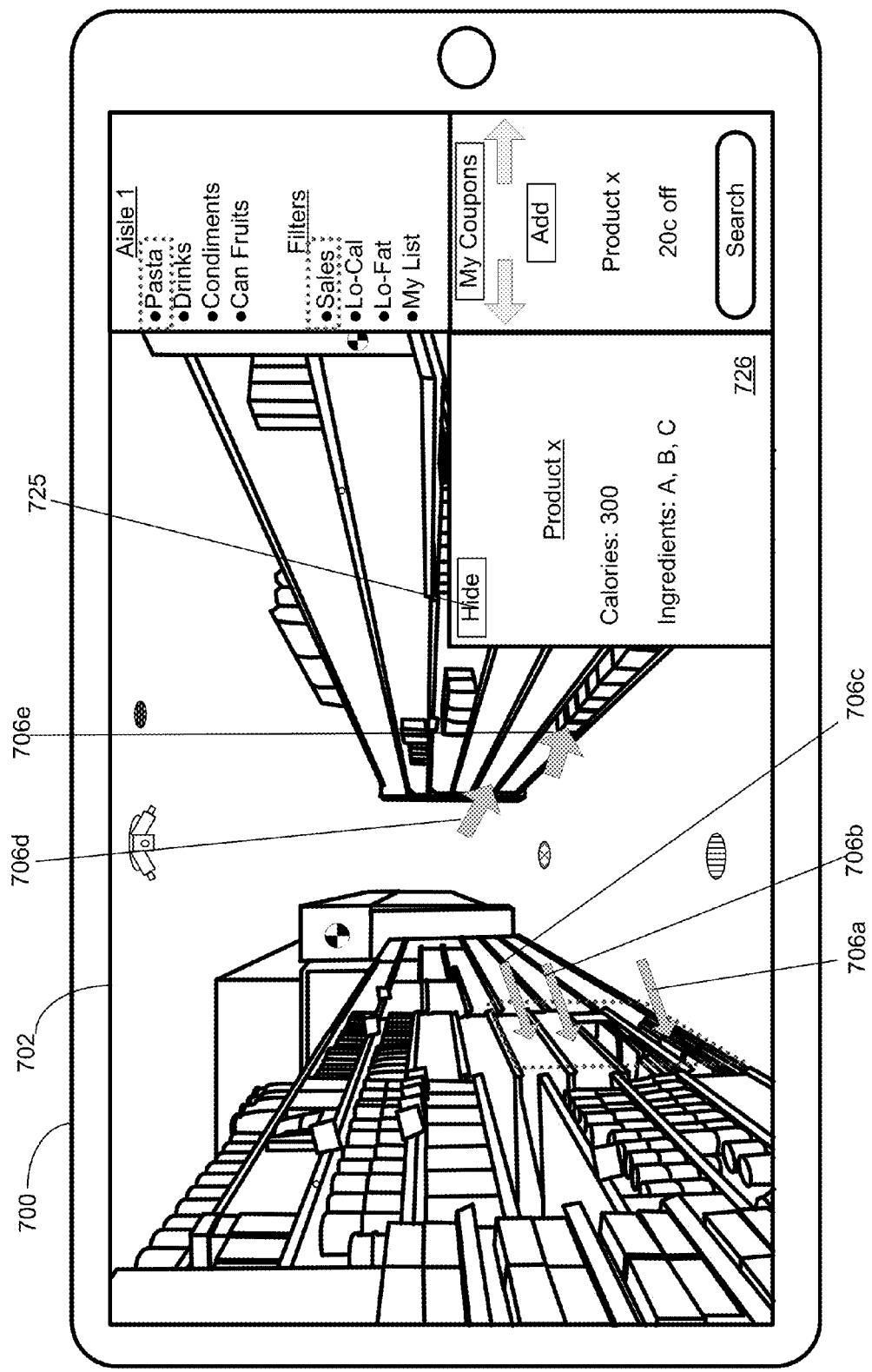
Figure 8A:
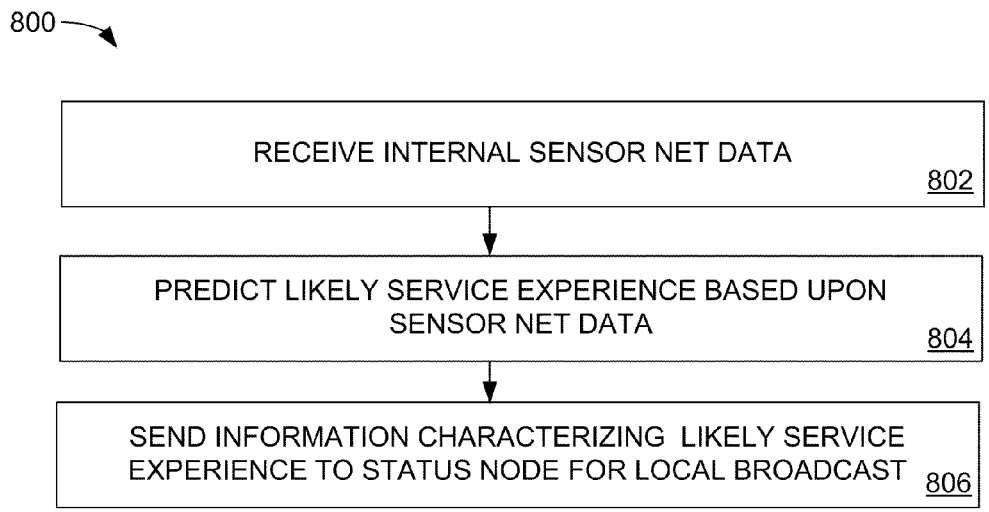
FIG. 8A is a flow chart of a method in a server for providing status data to a status node
Figure 8B:
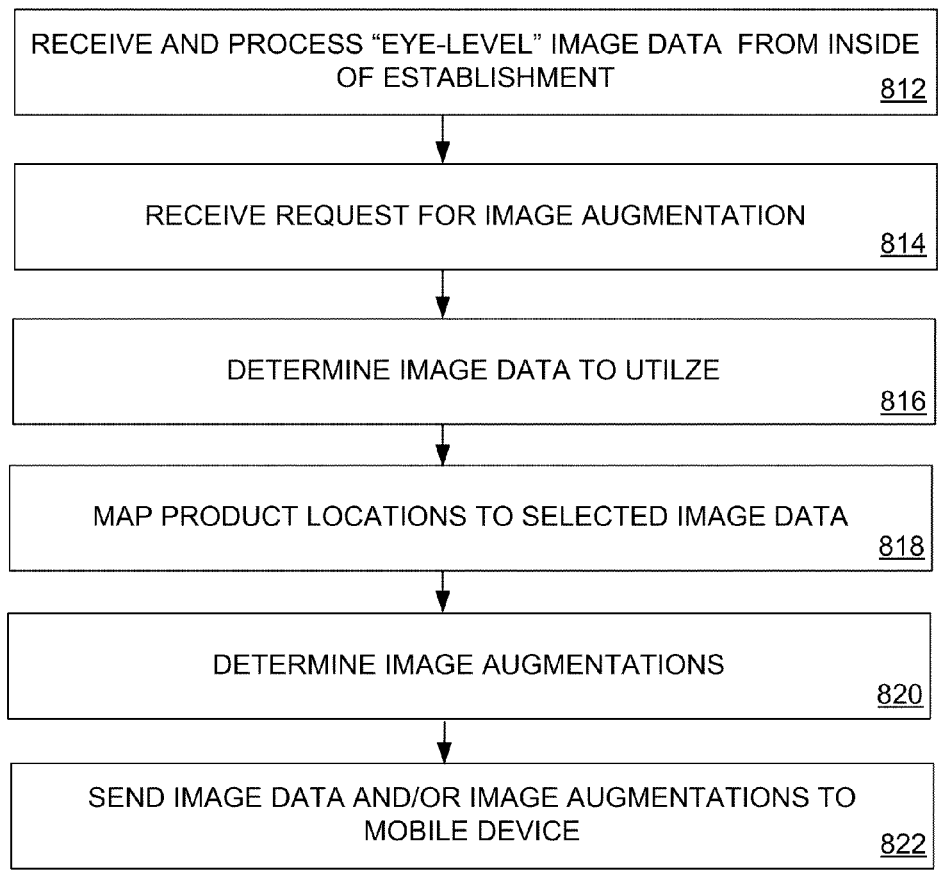
FIG. 8B is a flow chart of a method in a server for augmenting image data with product data.
Figure 8C:
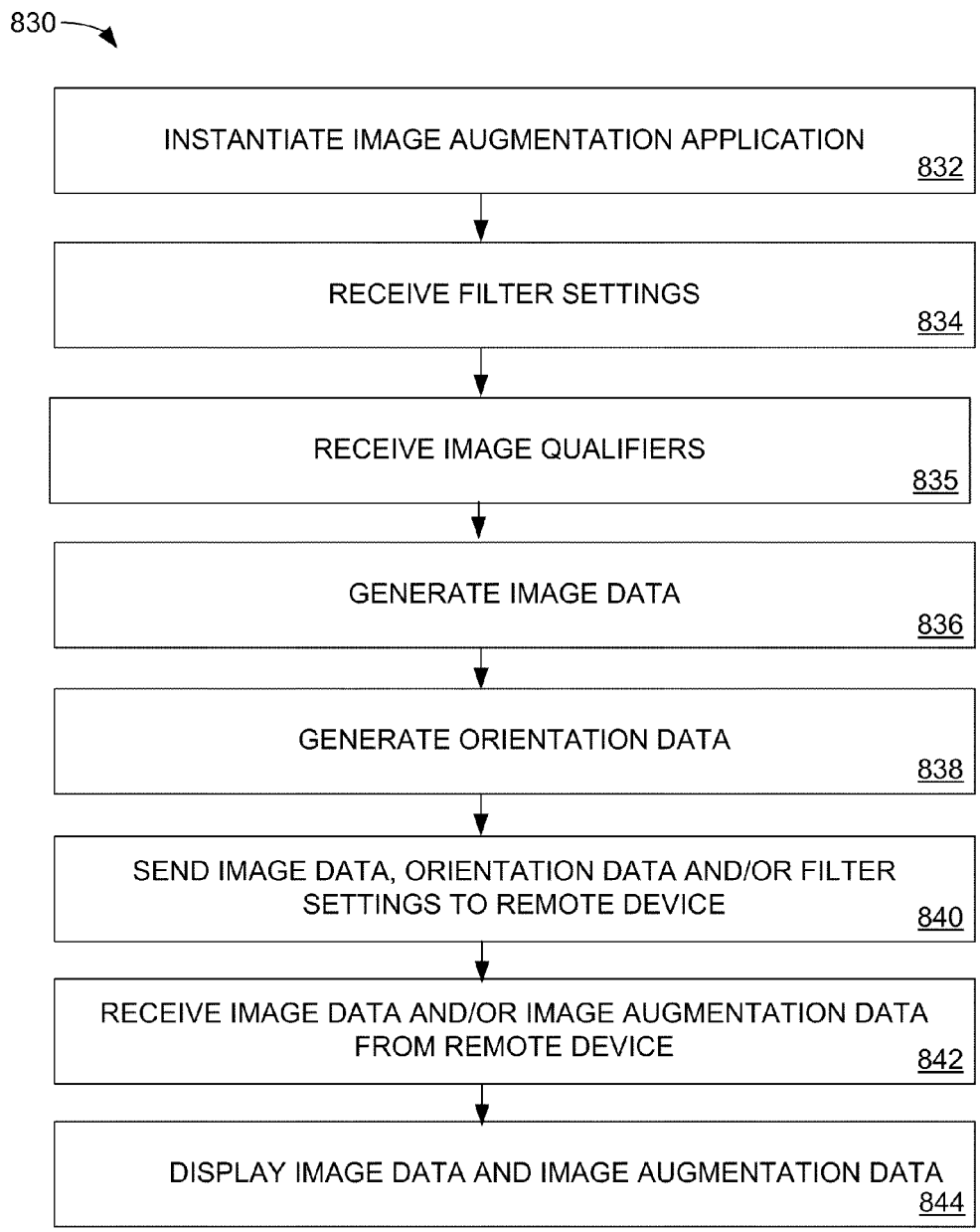
FIG. 8C is a flow chart of a method in a mobile device for displaying image data augmented with product data.

Next, some applications using sensor data, such as interfaces on a mobile device that aid in product displaying are described with respect to FIGS. 7A and 7B. Product displaying is a complex task that is affected by many factors. Some factors that affect product display location are the launch of new items, the displaying of seasonal products with high retail history, product profit margins and the current amount of stock availability. Typically, best-selling products are displayed in frontline positions that are more visible to consumers while others are relegated towards less attractive store locations. For instance, in a grocery store, best-selling or high-margin products are placed at eye level versus near a top or bottom of a shelf or on an end cap of shelf to increase their visibility. Identifying bestseller items is achieved by monitoring the number of completed transactions that ultimately inform how to appropriate display the products. However, monitoring of transaction does not provide a good insight about a product market potential as it only provides the number of items sold with no indication of the number of customers that saw that product displayed.

FIGS. 7A and 7B are illustrations of an interface 702 on a mobile device 700 viewing data associated with an internal sensor net in an establishment, such as establishment 500 described with respect to FIG. 5B. The mobile device 700 can include one or more input devices for providing navigation within the interface, such as but not limited to buttons, touch screens, tilt or motion sensors or magnetic sensors. In FIGS. 7A and 7B, the interface 500 is used to provide an augmented store shelf that brings to a user's attention various products. For the purposes of illustration only, the image data 600 described with respect to FIG. 6 is further described.

In one embodiment, the image data can be updated automatically according to a determined location of the mobile device. For example, as a person holding the mobile device walks down an aisle, new image data representative of their current locations and optionally their orientation can be output to the interface 702, as a person moves about a retail establishment. In one embodiment, an orientation of a person, such as a direction they are looking, can be determined from image data, such as image data, from an overhead camera. In another embodiment, an orientation can be based upon an orientation of a mobile device that the user is carrying. The mobile device can include one or more sensors that allow its orientation to be determined. This information can be supplied to a remote device.

In FIG. 7A, the image data in interface 702 is shown augmented with various indicators. For instance, indicators 706a-706f are arrows that point to various products on a store shelf. In general, indicators can be used to point to various items within an establishment and is not limited to products displayed on a shelf. An advantage of using indicators in this manner is that products can be brought to a user's attention without changing the physical placement of the product. Shelves typically have a limited number of high visibility areas where desirable products can be placed. Augmenting actual image data to highlight products allows any area of the shelf or a display structure to become more "visible" in the sense that a user's attention can be brought to a particular shelf location that they normally might not see.

Image data displayed in interface 702 may be representative of a current shelf status or recent shelf status. In using interface 700, the user may look back and forth between interface 700 and their surroundings. Differences between image data displayed in the interface and the actual surroundings may be distracting or confusing to a user. To minimize this distraction and potential confusion, the most current available image data can be used. For instance, current image data can be image data captured using a camera on the mobile device of the user.

In particular embodiments, the image data can be from an eye-level perspective, such as image data generated from a user's camera or from a camera positioned between 4-7 feet from the floor (as opposed to providing image data from a ceiling mounted camera). An advantage of providing an eye-level perspective image data is that the images are closer to what a user actually sees. Further, additional indicators added to the figure, such as at product locations, can appear to be at heights that are consistent with a user's "eye-level" perspective. Rendering indicators including height information, i.e., some distance from the floor, where the rendered height is close to a user's eye-level perspective, may make it easier for a user to find a product because the indicator provides visual information at what height to scan a store's shelf. Locating products in this manner, i.e., using eye-level perspective image data, may be more intuitive to a user because it utilizes a user's natural object capabilities.

In one example, the interface 700 can be configured to receive a request to locate a particular product. In response, an image of a shelf from a user's perspective can be provided, such as an image that the user would see if the user were looking at the shelf from a particular angle or directly facing the shelf. An indicator of the product location on the shelf can also be provided. Using an image that is representative of current conditions on the shelf may help the user to more quickly locate the product that they are trying to locate than if the image is not representative of a current state of the shelf. For instance, for the purposes of locating a product when the shelf is currently fully stocked, an image showing an empty or partly stocked shelf and indicator of a product location on the shelf, may not be as useful as an image that is closer to the current appearance of the shelf.

In various embodiments, the image data is updated at least once a day. A number of methods can be used to decrease the amount of time between updates. For example, image data can be updated regularly via cameras installed in the shelves or other parts of the retail establishment. In another embodiment, cameras can be mounted on shopping carts used in the store. As the shopping carts are pushed through the store, image data can be gathered that is used to update an image database. In another example, image data gathered from cameras on mobile devices carried by users can be used to provide more updated images. In this example, the users may submit images for use in interface 700 and these images can be augmented with additional data as shown in FIG. 7A.

The user-supplied images can also be used to update an image database that is supported by a remote device such as server 512 described with respect to FIG. 5B. The image database may store what is considered to be the most representative images of a current shelf status. The server 512 can be configured to select images for use in interface supported on different mobile devices, from the image database.

As an example of maintaining an image database with user-supplied images, the image database can be first updated at the beginning of the day after shelves have been restocked using establishment controlled cameras, such as via a sweep through the establishment with a mobile camera set-up as described with respect to FIG. 5B. Then, throughout the day, a device, such as server 512, can receive user generated images of particular parts of the store, such as from a user's mobile device. The user supplied images can be used in an interface, such as 702, generated on the user's device. In addition, user supplied images can also be added to the image database. These user supplied images can be used to update a shelf status as well as to track a shelf status throughout the day.

One advantage of this approach is that an establishment does not have to maintain a large number of cameras because image data for the interface, such as 702, is supplied via a user controlled device, such a mobile phone with a camera. Further, different a shelf status throughout the day can be determined from the user generated image data because throughout the day user's can generate images of shelf locations at various times. In this example, images of different shelf locations maintained in an image database are updated in asynchronous manner because different users will be interested in different shelf locations at different times and hence generate image data at different times.

Returning to FIG. 7A, the indicators can be used to direct a user's attention to various products that are near a user's desired location or near a user's current location. For example, as described above, the interface 702 can be configured to allow a user to identify a product that they are trying to locate. The interface 702 can display an indicator of the location of the product on the store shelf, such as indicator 706c which is shaped as an arrow. Another example of an indicator is the dotted box 704. The dotted box 704 can be used to indicate that a product or a group of related products is within the area of the dotted box. In general, indicators can be symbols of various shapes and/color where text and numbers are examples of symbols.

In FIG. 7A, the indicator 706c points to an empty shelf. In some embodiments, an application executing on the mobile device or a remote service can be configured to detect that a desired product is not present and provide a suggestion of alternate products. For instance, the application can be configured to recognize that the space where the product is supposed to be located and provide indicators of alternative products. For instance, indicator 706c can point to a particular brand of pasta that is currently not available. The application can determine the particular brand is out of stock or currently not stacked on the shelf and in response indicate locations of alternative brands. As an example, indicators 706a and 706b can point to locations of alternative pasta brands.

In another example, when it is determined that a user is looking or will be looking in a particular area of the shelf, indicators promoting nearby products can be generated in interface 702. The nearby products can be related or unrelated to a product that a current user is trying to obtain. For instance, a user can request a location of a particular pasta. In response, in interface 702 an indicator of the location of the pasta can be generated. In addition, an indicator of a competing brand of pasta can also be generated.

The indicator of the competing product can come with additional information, such as information about a sale or a coupon. Text displayed proximate to the indicator or as the indicator may be used to convey that additional information about a product is available. For instance, an indicator can be displayed with text, such as "on-sale" or "coupon available." In one embodiment, the sale or coupon information can be automatically displayed. For instance, the information can be displayed in interface 702, such as via 718 and 720, which shows a product name and coupon discount, respectively. In another embodiment, the user can touch the indicator or provide another input that triggers a display of additional information in interface 702.

In another embodiment, a system incorporating mobile device 700 can provide a bidding system for indicators. When a user is determined to be in a particular area or determined to be wishing to go to a particular area, such as indicated by a request for a location of a particular product, different product suppliers can be allowed to bid on indicators that are rendered with the image data of 702. The indicators can be of related or unrelated products near the current location or a desired location of the user. For example, a user can be trying to locate a product as indicated by 706f and a supplier can bid on an indicator to be placed at 706e to attract a user to this location. A supplier can reimburse a service provider, such as a retail merchandiser, for the placing of indicators of indicators and associated information, such as coupons or advertising, in interface 702.

In other embodiments, interface 702 can provide a number of controls that allow a user to control a display of augmented data rendered with the image data in the interface. For instance, the interface 702 can include a description of the general vicinity of the user, such as "Aisle 1." Different nearby sections can be listed, such as pasta, drinks, condiments or canned fruits. By selecting one or more of these indicators, such as via touch to the display on mobile device 700, locations of the different sections can be highlighted in the image. For instance, after selecting pasta 708 in the interface 702, the image data can be augmented with box 704. Various selections can be activated at once, pasta and drinks can both be selected at the same times and different indicators for these selections can be displayed simultaneously. Further, the touch screen can be enabled to process simultaneous touches.

In another embodiment, selectable filters can be provided for controlling a placement of indicators. For instance, filters can include such categories, as sales 710, Lo-Cal, Lo-Fat, My-list, organic (not shown), low-salt (not shown), heart healthy (not shown) and coupons. Sales can indicate all products in the image that are on sale. Sale products can be further filtered by category. For instance, all pasta products on sale can be indicated after a filter selection is received by the interface 702. The lo-cal filter can be used to select products that fall into a category defined as low-calorie, such as a maximum amount of calories per serving. Lo-fat can be used to select products that fall into a category defined as low-fat, such as a maximum amount of fat per serving. My-list can be used to select all products on a list entered by the user, such as a user's grocery list. Similarly, organic, low-salt and heart health can be used to select products falling into these categories. Coupons can be used to select all products for which an electronic coupon is available.

When a filter is selected, indicators of products falling into the filter category can be rendered with the image data. Multiple filters can be active at one time. For instance, indicators for both sales and my-list can be active at the same time. The indicators associated with different filters can be distinguished from one another in some manner, such as via a different shapes or colors. In one embodiment, the indicators can be rendered smaller or larger to correspond to a perspective shown in the image data. For instance, larger indicators can be rendered larger for objects that are larger and appear closer in the image while smaller indicators can be rendered for objects that are smaller and appear more distance in the image.

To determine where to render indicators in the image, objects with known locations in the image can be identified and some coordinate system can be mapped to the image using object recognition software as was discussed with respect to FIG. 5A. In some embodiments, it may be possible to directly identify particular products in the image. In other embodiments, different display structures appearing in the image can be identified where a mapping of products associated with various display structure locations may have been previously determined. Products can be indexed in a database according to their display structure locations. Thus, the display structures identified in the image can be searched for products that fulfill the filter definition.

In particular embodiments, an approximate point of origin where the image was generated can be determined. A search for products that fit a particular filter definition can be limited to only display structures that are within some distance of the point of origin where the image was generated. For instance, if one or more objects of some known size is identified in the image, based upon its "apparent" size in the image, i.e., how many pixels it takes up in the image, an estimate of how far away it is from the point of origin in the image can be determined. Based on this determination, estimates can be made in regards to how far particular areas and objects in the image are from a point of origin where the image was generated.

When a product associated with a particular filter is identified, a location of the product in physical coordinates can be mapped to image coordinates, such as particular pixel location in the image. In some embodiments, object recognition software can be employed to determine whether an object fitting a product's known dimensions appears at the indicated location. If the product is determined not to be present, then an alternate product can be indicated. Once an image location is determined for the product, then an indicator of the product's location can be rendered in the image. The size of the arrow can depend on whether the product appears near or far in the image, such as how far the product is from the point of origin determined for the image.

An additional function of interface 702 can be a search feature 722. When a search feature 722 is selected an input interface can be generated that allows different products to be identified. As one example, the input interface can be a keyboard interface that is displayed on the touch screen. In another example, the input interface can be a voice recognition application that allows products to be selected via an input of verbal commands.

Another additional function of interface 702 can be a coupon feature 712. As a user selects products, various coupons offers can be displayed on interface 702. A coupon can be kept by selecting the add button 716. By selecting the arrow buttons, such as 714, various coupons that have been previously kept can be displayed on interface 702.

In one embodiment, coupon that are selected can be saved to a user's account with an establishment, such that when they proceed to checkout, purchased products can be compared against their coupon list and savings automatically deducted. In another embodiment, kept coupons can be downloaded to a register from a mobile device via a communication interface, such as a wireless communication interface between the mobile device and the register. In yet another embodiment, images of coupons can be stored on the mobile, such as bar-codes associated with the coupons. The coupon bar-codes can be scanned from the images stored on the mobile device.

In various embodiments, the interface 702 can receive inputs that allow additional information about a product to be displayed. For instance, in FIG. 7B, a portion 726 of interface 702 is shown that displays additional product information, such as calorie information and ingredients. The interface can be hidden by selecting the hide button 725. When the hide button is selected, the portion 726 can collapse and return to a format as was described with respect to FIG. 7A.

In one embodiment, a database of images of a product from various angles can be assembled, such as images that provide a 360 degree view of the product. The interface 702 can be configured to display this image data in format that allows a product to be viewed from various angles. For instance, an image of the product from the front can be displayed. Then, the interface 702 can receive inputs indicating a wish to rotate the product and an image of the rotated product can be displayed. For instance, a product can be rotated such that an ingredient list on the back of the product can be viewed. The interface 702 can include a zoom-in/zoom-out feature so that smaller features, such as the text of an ingredient label can be viewed.

Similar to providing images of a product to be viewed from different angles, the interface 702 can be configured to receive inputs that allow different image views of the establishment to be displayed. As previously described the image views can include images generated from an eye-level perspective. For instance, the interface 702 can be configured to allow a user to look at shelf straight on rather than looking down the aisle as shown in FIG. 7B. In another example, the interface can be configured to receive inputs that allow a different portion of the establishment to be viewed such as another portion of the establishment. In addition, the interface can be configured to receive inputs that allow a size of a portion of an image to be increased or decreased on a display, i.e., zoom-in/zoom-out capability.

Images taken at different heights can be available. For instance, as previously described with respect to FIGS. 5B, a mobile device with cameras mounted at different heights can be used to capture image data. In one embodiment, the interface 702 can be configured to allow a user to select a height perspective displayed in the image. For instance, for the purposes of identifying locations a shorter person can select a height setting for the image data that is closer to their viewing perspective. However, for viewing products on higher shelves, the person can select height setting that is higher so that they can get a better view of products located on higher shelves.

FIG. 8A is a flow chart of a method 800 in a server for providing status data to a status node. As described with respect to FIG. 5B, the server can be in communication with an internal sensor net in an establishment and a status node that locally broadcasts status information. In 802, the server can receive sensor net data from the sensor net. For instance, the sensor net can provide data, such as image data or data relating to detected wireless devices.

The sensor net data can be used to determine quantities, such as how many patrons are in the establishment, how long each patron has been in the establishment and current patron locations throughout the establishment. In addition, the server can have access to schedule data, such as scheduled services and employee data, such as employees currently working. Further, the server can store data derived from observed employee and patron behavior, such as how long a patron typically takes to shop or how long an employee takes to move a patron through a checkout line.

In 804, based upon the sensor net data and optionally additional data, such as service schedule data and employee data, the server can be configured to make a prediction in regards to an experience that a patron is likely to receive from establishment. As an example, if a user enters an establishment within some time interval, such as within the next 5-10 minutes, the server can be configured to predict how long it may take for the user to complete their shopping and move through a checkout. As another example, information can be related to a prediction of a seating time for a restaurant. In yet another example, information can be related to prediction of how long it will take to receive a service, such as a scheduled or non-scheduled appoint for the service. The predictions can be updated at a selected intervals, such every 5 minutes, every 10 minutes, every 15 minutes, every ½ hour or once an hour as is applicable to a particular establishment.

The prediction can be characterized in different manners. For instance, more or less wait times in a store can be characterized as a message that the store is busy or not busy. In another example, specific time periods can be provided, such as a 5 minute wait to be seated in a restaurant or a 5 to 10 minute wait for a checkout in a grocery store. In 806, information characterizing the prediction can be sent to a status node for local broadcast such that mobile devices in reception range of the status node can receive the information. In other embodiments, the information can also be made available via a local data network connection, such as the internet. In this embodiment, the status information can be provided with a caveat, such as that it is valid for the next 10 minutes or 20 minutes, etc.

In other embodiments, the server can be configured to provide "unprocessed" sensor data to a remote device, such as a mobile device. For instance, the server can be configured to provide sensor data, such as live video feeds or still images from one or more locations in an establishment, such as a check-out counter or particular store department. In some embodiments, the unprocessed sensor data can be broadcast locally and may only be available locally, such as within an establishment or outside nearby an establishment. The server can be configured to determine whether a device is local or not and only provide unprocessed sensor data to local devices. For instance, the server may be able to determine a current location of the device via a sensor net or via information provided from the device. In other embodiments, unprocessed sensor data can be provide to more remote devices, such as devices communicating with the server over the internet.

In one embodiment, a server can be configured to receive a request for information about a product that is typically stocked by an establishment and determine a sensor that can provide current information about the product in relation to its display status in the store. For example, a server can receive a request about a product that is normally stocked in the store and in response, provide an image of the display structure in the store where the product is typically displayed. The image data can allow a patron to determine whether the product is currently available as well as help the user locate the product in the store if they choose to enter the store and purchase the product.

A memory on the server can store information regarding which sensors can provide information about which products. The server can regularly receive and store information received from various sensors in an establishment sensor net. When the server receives a request for information about a particular product, it can use the information in regards which sensor provides information on which products to locate the most current sensor data about the product.

FIG. 8B is a flow chart of a method 810 in a server for augmenting image data with product data. In 812, the server can receive "eye-level" image data from inside of an establishment. The "eye-level" image data can be generated by a camera controlled by a patron, the retail establishment or combinations thereof. In a retail establishment, the image data can include images of products located on display structures or resting on the establishment floor. For instance, in a grocery store, the images can include products placed on shelves or stacked on a floor.

In 814, the server can receive a request to augment image data. For instance, the server can receive a request to identify locations of one or more requested products in an image. In 816, the server can determine image data to utilize for the purposes of augmentation. In one embodiment, the image data can be provided from a mobile device carried by the user. For instance, the user can take a picture looking down an aisle of a grocery store and this image can be sent to the server.

In another embodiment, an image database can be maintained on the server or the server can access a number of cameras where the cameras provide real-time image data. The determination of what image data to utilize can include locating in the image database an image that shows the information of interest or grabbing a frame of data from a video feed that shows the information of interest, such as a product as displayed on a shelf.

In 818, product locations can be mapped to the image data. For instance, a mapping of product locations to physical locations in an establishment can be stored on the server. Objects in the image data can be identified and then a mapping of physical coordinate to pixel coordinates can be identified such that a determination of the locations of various products in pixel coordinates is determined.

In particular embodiments, depth data can be provided with the image data. For instance, depth data can be associated with each of the pixels in an image taken a 3-D depth sensing camera. The depth data is relative to a position of the camera that generated the image, i.e., distance from the camera. For an image generated from a mobile device, when an object with a known physical location is identified in an image, then physical coordinates can be approximated for each pixel in the image because the relative depth locations for all the pixels are known relative to one another and the coordinates of a physical location are known.

For a 3-D depth sensing camera with a known fixed location, the depth data can be used to approximate physical coordinates for each of the pixels in the images using the known position of the camera and relative distances determined for each pixel in the image. For a mobile camera, when two objects with known physical locations are identified or an object with a known physical location and known physical size is identified, then a more accurate physical coordinates can be determined for each of the pixel locations in the image using the physical distance between the two points in the image, which is known, and relative depth distances from each of the two points to other points in the image which is known. A similar process could be used for two 3-D depth sensing cameras with known locations where a portion of the images from both cameras is overlapping.

In 820, image augmentations can be determined. For instance, if a location of one or more different products is desired, a determine of where to render symbols including their size and placement can be made, such that the locations of the one or more products is identified when the augmented image data is rendered with the original image data. In particular embodiments, when depth data is determined for each of the pixels in an image, the depth data can be used to determine a size of an image augmentation, such as a size of a symbol. For instance, symbols placed next to locations that are farther away in the image can be rendered smaller than symbols placed next to locations that are closer in the image.

In 822, image data and/or instructions for generated image augmentations can be sent to the mobile device. In one embodiment, the image data is generated on the mobile device and is resident on the mobile device. Thus, instructions for generating only the image augmentations can be sent to the mobile device. In other embodiments, the image data can be augmented on the server and an image with rendered augmentations can be sent to the mobile device. In yet other embodiments, image data selected by the server and instructions for augmenting the image data can be sent to the mobile device.

FIG. 8C is a flow chart of a method 830 in a mobile device for displaying image data augmented with product data. In 832, an image augmentation application can be instantiated on the mobile device. In particular embodiments, the image augmentation application can be configured to work with a camera on the mobile device. For instance, the camera can generate images that are augmented and output via the image augmentation application. The mobile device can include a touch screen activated display.

In 834 and 835, a number of filter setting and image qualifiers can be input via the mobile device. For instance, a filter setting can be "show all sale items," or "show all sale items related to products on my grocery list." The image data can be augmented according to the filter settings. An image qualifier can be data that is used to select the image of interest. For instance, a particular product or category of products can be input. This information can be used to select an image or images that show the product or products of interest. Another example of an image qualifier can be a particular area of an establishment, such as "show aisle 1" or "show dairy section." In response, a remote device, such as a server, can select an image that shows aisle 1 or the dairy section from an eye level perspective.

As previously described, an eye level perspective can be images between taken from between 4-7 feet. For certain establishments, image data can be generated from even lower heights. For instance, in a toy store, it may be desirable to image data from child's "eye level" perspective. Camera images can be taken from a number of heights of the same area. In some embodiments, if a user's height is known, an image can be selected that is closest to a user's height.

In other embodiments, a user can select image data from different perspectives. For instance, to better see a product on a higher shelf, a user can request image data taken from a higher perspective. The application can be configured to receive inputs that allow a user to select image and navigate between images of different perspectives.

In 836, as described above, a camera on the mobile device can be used to generate image data that can be used with the application. For instance, via a camera on the mobile device image data can be generated. In one embodiment, an image generated on the mobile device can be augmented. In another embodiment, an image generated on the mobile device can be used to determine an orientation of a user. For instance, an image generated by the mobile device can include depth information generated by a 3-D depth sensing camera that allows an orientation of the user to be better determined. This orientation data can be used by a remote device to select an image related orientation depicted in the image generated on the mobile device. Via a local sensor net, a remote device can also be configured to track a position and/or location of a user, which can be also be used to select image data.

Besides image data, the mobile device can also be configured to generate other types of orientation data. For instance, the mobile device can gather information from GPS or cell towers that allow its location to be determined. Further, the mobile device can include sensors, such as accelerometers or magnetic detectors (e.g., a compass) that allow the orientation of the mobile device to be determined. In 838, the mobile device can generate orientation data.

In 840, the mobile device can send image data, orientation data, filter settings, image qualifiers or combinations thereof to remote device. In 842, the mobile device can receive image data, augmented image data and/or instructions for augmenting image data from a remote device. In 844, augmented image data can be displayed to a touch screen display on the mobile device. In particular embodiments, the image augments, such as various symbols, can be used to define buttons for a touch screen. Thus, when the touch screen is activated proximate to one or more of the image augments, different actions can be triggered on the mobile device. For instance, activating a symbol next to a product can cause additional information to be displayed about the product.

The advantages of the invention are numerous. Different aspects, embodiments or implementations may yield one or more of the following advantages. One advantage is reducing infrastructure costs. Methods and apparatus for providing city services, such as parking services, are described that leverage portable devices, such as cell phones and their associated network infrastructure. The described apparatus and methods may improve access and efficient utilization of city services without requiring maintenance of a large network infrastructure. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A system comprising
    a server including a processor and a memory and at least one communication interface; said processor designed or configured
    1) to receive a first image including pixel data showing a portion of an interior of a retail establishment wherein the first image is captured using a camera on a mobile device carried by a customer within the retail establishment and wherein the first image shows one or more structures for displaying products and one or more products placed on the structures in the retail establishment; 2) receive location information and orientation information from the mobile device wherein the orientation information indicates a current orientation of the mobile device, 3) store the first image to the memory; 4) recognize in the pixel data associated with the first image at least one object to identify the portion of the interior of the retail establishment shown in the first image to map the pixel data to physical locations in the interior of the retail establishment; 5) based upon the identified portion of the retail establishment shown in the first image, determine a pixel location in the pixel data associated with the first image to draw an indicator wherein the indicator points to at least one product placement location visible in the first image; 6) based upon the orientation information and the pixel data from the first image, generate a second image including a portion of the pixel data associated with the first image and the indicator drawn at the determined pixel location in the first image and 7) send the second image to the mobile device in communication with the server via the communication interface wherein the second image is output to a display device associated with the mobile device to help the customer to find a product within the interior of the retail establishment;

a sensor node, placed within the retail establishment, configured to communicate with the server via the at least one communication interface and the mobile device via a wireless interface; and the mobile device including the camera, the display device, the wireless communication interface, a speaker, a microphone, a cellular communication interface, a GPS receiver, a local, a CPU and a memory, the processor configured to communicate with remote devices via the cellular communication, the server via the sensor, receive GPS information from the GPS receiver, determine a mobile device location using the GPS information, receive an input signal associated with the camera, in response to the input signal, cause the camera to capture the first image, receive image data from the camera including the first image, output the first image to the display device wherein the first image includes the at least one product placement location, send the first image data, the location data and the orientation data, to the server via the wireless interface, receive from server the second image and output the second image data to the display device wherein the second image includes the at least one product placement location visible in the first image and the indicator which points to the at least one product placement location added by the server.

2. The system of claim 1, wherein the camera is positioned between 4-7 feet above a floor of the retail establishment.

3. The system of claim 1 wherein the memory is configured to store a physical size, a physical location or combinations thereof of the at least one object.

4. The system of claim 3, wherein the physical size or the physical location of the at least one object identified in the first image is used to determine where to draw the first indicator.

5. The system of claim 4, wherein the physical size or the physical location of the at least one object identified in the first image is used to determine a size the first indicator that is to be drawn.

6. The system of claim 1, wherein the at least one object is a product proximate to the at least one product placement location that is visible in the first image.

7. The system of claim 1, wherein the processor is further configured to determine a size of the indicator to account for image perspective.

8. The system of claim 7, wherein the size of the indicator is determined such that when the determined location of the indicator is at a location that appears closer in the first image, the indicator is drawn larger and when the determined location of the indicator is at a location that appears farther away in the first image, the indicator is drawn smaller.

9. The system of claim 1, wherein the memory is further configured to store an image database including images taken from an eye-level perspective throughout the interior of the retail establishment.

10. The system of claim 9, wherein the images in the image database are updated one or more times per day to reflect changes in an arrangement of products placed on the one or more structures for displaying products.

11. The system of claim 9, wherein the processor is further designed or configured to receive an image from the mobile device carried by the customer within the retail establishment and to determine whether to add the image to the image database.

12. The system of claim 9, wherein the processor is in communication with one or more cameras distributed throughout the retail establishment and wherein the processor is further configured to receive images taken from an eye-level perspective from the one or more cameras and add the images from the one or more cameras to the image database.

13. The system of claim 9, wherein the processor is further designed or configured to 1) receive from the mobile device carried by the customer information identifying a product and in response find an image stored in the image database that shows a product placement location for the identified product; and 2) send the found image showing the product placement location for the identified product to the mobile device.

14. The system of claim 1, wherein the processor is further configured to determine locations of a plurality of indicators to draw on the first image wherein each of the plurality of indicators is proximate to a different product placement location.

15. The system of claim 14, wherein at least one of the different product placement locations is empty of the product normally placed at the product placement location.

16. The system of claim 14, wherein the processor is further configured to receive a filter setting from the mobile device and based upon, the filter setting select a set of different product placement locations for which indicators are to be drawn on the first image.

17. The system of claim 14, wherein the server is a kiosk.

18. A system comprising:

a kiosk comprising a processor and a memory and at least one communication interface; said processor designed or configured 1) to receive first image including pixel data showing a portion of an interior of a retail establishment wherein the first image is captured using a camera on a mobile device carried by a customer within the retail establishment and wherein the first image shows one or more structures for displaying products and one or more products placed on the structures in the retail establishment; 2) receive location information and orientation information from the mobile device wherein the orientation information indicates a current orientation of the mobile device, 3) store the first image to the memory; 4) recognize in the pixel data associated with the first image at least one object to identify the portion of the interior of the retail establishment shown in the first image to map the pixel data to physical locations in the interior of the retail establishment; 5)

based upon the identified portion of the retail establishment shown in the first image, determine a pixel location in the pixel data associated with the first image to draw an indicator wherein the indicator points to at least one product placement location visible in the first image; 6) based upon the orientation information and the pixel data from the first image, generate a second image including a portion of the pixel data associated with the first image and the indicator drawn at the determined pixel location in the first image and 7) send the second image to the mobile device in communication with the server via the communication interface wherein the second image is output to a display device associated with the mobile device to allow the customer to locate a product placed at the product placement location visible in the second image; and a plurality of cameras is configured to take images within the retail establishment and wherein the kiosk is configured to receive the images via the at least one communication interface.

* * * * *